US 6,816,545 B1

(12) United States Patent
Davis et al.

(10) Patent No.: US 6,816,545 B1
(45) Date of Patent: Nov. 9, 2004

(54) SYSTEMS, METHODS AND COMPUTER PROGRAM PRODUCTS FOR IDENTIFYING DIGITAL IMPAIRMENTS IN MODEMS BASED ON CLUSTERS AND/OR SKIPS IN PULSE CODE MODULATION SIGNAL LEVELS

(75) Inventors: Gordon Taylor Davis, Chapel Hill, NC (US); Ajay Dholakia, Gattikon (CH); Dongming Hwang, Cary, NC (US); Malcolm Scott Ware, Raleigh, NC (US); Hua Ye, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/430,217

(22) Filed: Oct. 29, 1999

(51) Int. Cl.[7] .................................................. H04B 1/38
(52) U.S. Cl. ....................................................... 375/222
(58) Field of Search ................................ 375/222, 242; 370/523; 379/88.07, 353

(56) References Cited

U.S. PATENT DOCUMENTS

| 3,557,308 A | 1/1971 | Alexander et al. ......... 178/69.5 |
| 3,622,877 A | 11/1971 | MacDavid et al. ........ 324/73 R |
| 3,683,120 A | 8/1972 | Schenkel ................... 179/15 A |
| 3,729,717 A | 4/1973 | de Koe et al. ............ 340/172.5 |
| 4,112,427 A | 9/1978 | Hofer et al. ................. 340/347 |

(List continued on next page.)

FOREIGN PATENT DOCUMENTS

| EP | 0 473 116 A2 | 8/1991 | ............ H04N/1/00 |
| EP | 0 659 007 A2 | 11/1994 | .......... H04M/11/06 |
| EP | 0 669 740 A2 | 12/1994 | ............ H04L/27/00 |
| FR | 2 345 019 | 3/1976 | ........... H04L/27/10 |
| WO | WO 96/18261 | 6/1996 | .......... H04M/11/00 |
| WO | WO 98/37657 | 8/1998 | |

OTHER PUBLICATIONS

Erup, et al., *Interpolation in Digital Modems—Part II: Implementation and Performance*, IEEE Transactions on Communications, vol. 41, No. 6, pp. 998–1008 (Jun. 1993).
Fischer, *Signal Mapping for PCM Modems, V–pcm Rapporteur Meeting*, Sunriver, Oregon, USA, , 5 pgs. (Sep. 4–12, 1997).
Gardner, *Interpolation in Digital Modems—Part I: Fundamentals*, IEEE Transactions on Communications, vol. 41, No. 3, pp. 501–507 (Mar. 1993).

(List continued on next page.)

*Primary Examiner*—Khai Tran
(74) *Attorney, Agent, or Firm*—Scott W Reid; Myers Bigel Sibley & Sajovec, P.A.

(57) ABSTRACT

Digital impairments in a set of Pulse Code Modulation (PCM) signal levels that are received at a client modem from a server modem are identified by compressing the set of PCM signal levels into a signature. Digital impairments are determined based on the signature. In a preferred embodiment, the PCM signal levels are compressed into a signature by identifying clusters and/or skips in the set of PCM signal levels. In particular, when transmitting PCM signal levels from a server modem to a client modem over a connection that is subject to digital impairments such as Robbed Bit Signaling (RBS) and/or PAD digital impairments and quantization, some adjacent PCM signal levels may become identical or very close to one another. Moreover, other adjacent signal levels may have a difference that is at least approximately twice the difference of other levels. The former phenomenon is referred to as a "cluster" and the latter phenomenon is referred to as a "skip". By identifying clusters and/or skips in the set of PCM signals that are received at the client modem from the server modem, a signature of the network connection may be obtained. Digital impairments including RBS and/or PAD may be identified using the signature.

36 Claims, 5 Drawing Sheets

U.S. PATENT DOCUMENTS

| | | | | |
|---|---|---|---|---|
| 4,132,242 A | | 1/1979 | Carroll, Jr. | 137/263 |
| 4,208,630 A | | 6/1980 | Martinez | 375/7 |
| 4,237,552 A | | 12/1980 | Aikoh et al. | 370/83 |
| 4,270,027 A | | 5/1981 | Agrawal et al. | 179/81 R |
| 4,434,322 A | | 2/1984 | Ferrell | 178/22.13 |
| 4,450,556 A | | 5/1984 | Boleda et al. | 370/58 |
| 4,577,310 A | | 3/1986 | Korsky et al. | 370/58 |
| 4,578,796 A | | 3/1986 | Charalambous et al. | 375/8 |
| 4,581,737 A | * | 4/1986 | Sparrell | 370/477 |
| 4,720,861 A | | 1/1988 | Bertrand | 381/36 |
| 4,731,816 A | | 3/1988 | Hughes-Hartogs | 379/98 |
| 4,756,007 A | | 7/1988 | Qureshi et al. | 375/37 |
| 4,760,598 A | | 7/1988 | Ferrell | 380/44 |
| 4,797,898 A | | 1/1989 | Martinez | 375/7 |
| 4,833,706 A | | 5/1989 | Hughes-Hartogs | 379/98 |
| 4,868,863 A | | 9/1989 | Hartley et al. | 379/98 |
| 4,884,285 A | | 11/1989 | Heynen et al. | 375/25 |
| 4,890,303 A | | 12/1989 | Bader | 375/107 |
| 4,890,316 A | | 12/1989 | Walsh et al. | 379/98 |
| 4,894,847 A | | 1/1990 | Tjahjadi et al. | 375/121 |
| 4,901,333 A | | 2/1990 | Hodgkiss | 375/98 |
| 4,943,980 A | | 7/1990 | Dobson et al. | 375/42 |
| 4,953,210 A | | 8/1990 | McGlynn et al. | 380/48 |
| 4,967,413 A | | 10/1990 | Otani | 371/37.4 |
| 4,972,360 A | | 11/1990 | Cuckier et al. | 364/724.04 |
| 4,985,902 A | | 1/1991 | Gurcan | 375/14 |
| 4,991,169 A | | 2/1991 | Davis et al. | 370/77 |
| 4,995,030 A | | 2/1991 | Helf | 370/32.1 |
| 5,005,144 A | | 4/1991 | Nakajima et al. | 364/565 |
| 5,007,047 A | | 4/1991 | Sridhar et al. | 370/32.1 |
| 5,014,299 A | | 5/1991 | Klupt et al. | 379/98 |
| 5,033,062 A | | 7/1991 | Morrow et al. | 375/7 |
| 5,038,365 A | | 8/1991 | Belloc et al. | 375/8 |
| 5,040,190 A | | 8/1991 | Smith et al. | 375/4 |
| 5,052,000 A | | 9/1991 | Wang et al. | 371/43 |
| 5,058,134 A | | 10/1991 | Chevillat et al. | 375/39 |
| 5,065,410 A | | 11/1991 | Yoshida et al. | 375/98 |
| 5,067,125 A | | 11/1991 | Tsuchida | 370/79 |
| 5,068,875 A | | 11/1991 | Quintin | 375/78 |
| 5,107,520 A | | 4/1992 | Karam et al. | 375/60 |
| 5,111,481 A | | 5/1992 | Chen et al. | 375/14 |
| 5,119,401 A | | 6/1992 | Tsujimoto | 375/14 |
| 5,119,403 A | | 6/1992 | Krishnan | 375/39 |
| 5,134,611 A | | 7/1992 | Steinka et al. | 370/79 |
| 5,142,552 A | | 8/1992 | Tzeng et al. | 375/14 |
| 5,157,690 A | | 10/1992 | Buttle | 375/14 |
| 5,187,732 A | | 2/1993 | Suzuki | 379/5 |
| 5,210,755 A | | 5/1993 | Nagler et al. | 370/108 |
| 5,225,997 A | | 7/1993 | Lederer et al. | 364/550 |
| 5,253,272 A | | 10/1993 | Jaeger et al. | 375/60 |
| 5,253,291 A | | 10/1993 | Naseer et al. | 379/406 |
| 5,265,151 A | | 11/1993 | Goldstein | 379/97 |
| 5,285,474 A | | 2/1994 | Chow et al. | 375/13 |
| 5,291,479 A | | 3/1994 | Vaziri et al. | 370/58.2 |
| 5,311,578 A | | 5/1994 | Bremer et al. | 379/97 |
| 5,317,594 A | | 5/1994 | Goldstein | 375/8 |
| 5,351,134 A | | 9/1994 | Yaguchi et al. | 358/435 |
| 5,353,280 A | | 10/1994 | Ungerböck | 370/32.1 |
| 5,386,438 A | | 1/1995 | England | 375/121 |
| 5,394,110 A | | 2/1995 | Mizoguchi | 329/304 |
| 5,394,437 A | | 2/1995 | Ayanoglu et al. | 375/222 |
| 5,398,303 A | | 3/1995 | Tanaka | 395/51 |
| 5,402,445 A | | 3/1995 | Matsuura | 375/229 |
| 5,406,583 A | | 4/1995 | Dagdeviren | 375/5 |
| 5,418,842 A | | 5/1995 | Cooper | 379/98 |
| 5,432,794 A | | 7/1995 | Yaguchi | 371/5.5 |
| 5,434,884 A | | 7/1995 | Rushing et al. | 375/235 |
| 5,475,711 A | | 12/1995 | Betts et al. | 375/240 |
| 5,491,720 A | | 2/1996 | Davis et al. | 375/222 |
| 5,513,216 A | | 4/1996 | Gadot et al. | 375/233 |
| 5,519,703 A | | 5/1996 | Chauffour et al. | 370/84 |
| 5,528,625 A | | 6/1996 | Ayanoglu et al. | 375/222 |
| 5,528,679 A | | 6/1996 | Taarud | 379/34 |
| 5,533,048 A | | 7/1996 | Dolan | 375/222 |
| 5,534,913 A | | 7/1996 | Majeti et al. | 348/7 |
| 5,546,395 A | | 8/1996 | Sharma et al. | 370/84 |
| 5,563,908 A | | 10/1996 | Kaku et al. | 375/222 |
| 5,566,211 A | | 10/1996 | Choi | 375/332 |
| 5,598,401 A | | 1/1997 | Blackwell et al. | 379/94 |
| 5,625,643 A | | 4/1997 | Kaku et al. | 375/222 |
| 5,634,022 A | | 5/1997 | Crouse et al. | 395/704 |
| 5,640,387 A | | 6/1997 | Takahashi et al. | 370/359 |
| 5,646,958 A | | 7/1997 | Tsujimoto | 375/233 |
| 5,671,250 A | | 9/1997 | Bremer et al. | 375/222 |
| 5,694,420 A | | 12/1997 | Ohki et al. | 375/222 |
| 5,710,792 A | | 1/1998 | Fukawa et al. | 375/229 |
| 5,724,393 A | | 3/1998 | Dagdeviren | 375/296 |
| 5,726,765 A | | 3/1998 | Yoshida et al. | 358/412 |
| 5,729,226 A | | 3/1998 | Betts et al. | 341/94 |
| 5,732,104 A | | 3/1998 | Brown et al. | 375/222 |
| 5,734,663 A | | 3/1998 | Eggenberger | 371/39.1 |
| 5,751,717 A | | 5/1998 | Babu et al. | 370/466 |
| 5,751,796 A | | 5/1998 | Scott et al. | 379/93.31 |
| 5,754,594 A | | 5/1998 | Betts et al. | 375/285 |
| 5,757,849 A | | 5/1998 | Gelblum et al. | 375/222 |
| 5,757,865 A | | 5/1998 | Kaku et al. | 375/344 |
| 5,761,247 A | | 6/1998 | Betts et al. | 375/316 |
| 5,768,311 A | | 6/1998 | Betts et al. | 375/222 |
| 5,778,024 A | | 7/1998 | McDonough | 375/216 |
| 5,784,377 A | | 7/1998 | Baydar et al. | 370/463 |
| 5,784,405 A | | 7/1998 | Betts et al. | 375/222 |
| 5,784,415 A | | 7/1998 | Chevillat et al. | 375/341 |
| 5,793,809 A | | 8/1998 | Holmquist | 375/242 |
| 5,796,808 A | | 8/1998 | Scott et al. | 379/93.31 |
| 5,801,695 A | | 9/1998 | Townshend | 375/340 |
| 5,805,669 A | | 9/1998 | Bingel et al. | 379/28 |
| 5,809,075 A | | 9/1998 | Townshend | 375/254 |
| 5,812,537 A | | 9/1998 | Betts et al. | 370/286 |
| 5,815,534 A | | 9/1998 | Glass | 375/326 |
| 5,822,371 A | | 10/1998 | Goldstein et al. | 375/242 |
| 5,825,816 A | | 10/1998 | Cole et al. | 375/222 |
| 5,825,823 A | | 10/1998 | Goldstein et al. | 375/286 |
| 5,831,561 A | | 11/1998 | Cai et al. | 341/106 |
| 5,835,532 A | | 11/1998 | Strolle et al. | 375/233 |
| 5,835,538 A | | 11/1998 | Townshend | 375/295 |
| 5,838,724 A | | 11/1998 | Cole et al. | 375/222 |
| 5,839,053 A | | 11/1998 | Bosch et al. | 455/13.1 |
| 5,844,940 A | | 12/1998 | Goodson et al. | 375/222 |
| 5,850,388 A | | 12/1998 | Anderson et al. | 370/252 |
| 5,850,421 A | | 12/1998 | Misra et al. | 375/354 |
| 5,852,631 A | | 12/1998 | Scott | 375/222 |
| 5,862,141 A | | 1/1999 | Trotter | 370/468 |
| 5,862,179 A | | 1/1999 | Goldstein et al. | 375/242 |
| 5,862,184 A | | 1/1999 | Goldstein et al. | 375/295 |
| 5,870,429 A | | 2/1999 | Moran, III et al. | 375/222 |
| 5,872,817 A | | 2/1999 | Wei | 375/341 |
| 5,881,066 A | | 3/1999 | Lepitre | 371/20.5 |
| 5,881,102 A | | 3/1999 | Samson | 375/222 |
| 5,887,027 A | | 3/1999 | Cohen et al. | 375/222 |
| 5,911,115 A | | 6/1999 | Nair et al. | 455/63 |
| 5,914,982 A | | 6/1999 | Bjarnason et al. | 375/222 |
| 5,918,204 A | | 6/1999 | Tsurumaru | 704/214 |
| 5,926,506 A | | 7/1999 | Berthold et al. | 375/222 |
| 6,301,296 B1 | * | 10/2001 | Krishnan et al. | 375/222 |
| 6,317,419 B1 | * | 11/2001 | Olafsson et al. | 370/292 |
| 6,553,074 B1 | * | 4/2003 | Shalvi et al. | 375/242 |

OTHER PUBLICATIONS

Humblet et al., *The Information Driveway*, IEEE Communications Magazine, pp. 64–68 (Dec. 1996).

Kalet et al., *The Capacity of PCM Voiceband Channels,* IEEE International Conference on Communications '93, pp. 507–511 (Geneva, Switzerland, May 23–26, 1993).

Mueller et al., *Timing Recovery in Figital Synchronous Data Receiver,* IEEE Transactions on Communications, vol. Com–24, No. 5, pp. 516–531 (May 1976).

Okubo et al., *Building Block Design of Large Capacity PCM–TDMA Subscriber System and Direct Digital Interface to Digital Exchange,* Japan Radio Co., Ltd., pp. 69–73 (Japan).

Pahlavan et al., *Nonlinear Quantization and the Design of Coded and Uncoded Signal Constellations,* IEEE Transactions on Communications, vol. 39, No. 8, pp. 1207–1215 (Aug. 1991).

Proakis, *Digital Signaling Over a Channel with Intersymbol Interference, Digital Communications,* pp. 373, 381 (McGraw–Hill Book Company, 1983).

Williams et al., *Counteracting the Quantisation Noise from PCM Codecs,* BT Laboratories, pp. 24–29 (UK).

*A Digital Modem and Analogue Modem Pair for Use on the Public Switched Telephone Network (PSTN) at Data Signalling Rates of Up to 56 000 Bit/s Downstream and 33 600 Bit/s Upstream,* ITU–T V.90 (Sep. 1998).

*Series V: Data Communication Over the Telephone Network: Interfaces and voiceband modems; A modem operating at data signalling rates of up to 33 600 bit/s for use on the general switched telephone network and on leased point–to–point 2–wire telephone type circuits,* ITU–T V.34 (10/96).

Bell, R.A., et al., *Automatic Speed Reduction and Switched Network Back–up,* IBM Technical Disclosure Bulletin, vol. 32, No. 1, pp. 154–157 (Jun. 1989).

Abbiate, J.C., et al., *Variable–Data Transmission Modem,* IBM Technical Disclosure Bulletin, vol. 17, No. 11, pp. 3301–3302 (Apr. 1975).

*Data Communication Over the Telephone Network; Procedures for Starting Sessions of Data Transmission Over the General Switched Telephone Network,* ITU–T V.8 (09/94).

*Line Quality Monitoring Method,* IBM Technical Disclosure Bulletin, vol. 18, No. 8, pp. 2726–2726 (Jan. 1976).

*Loopback Tests for V.54 Data Communication Equipment,* IBM Technical Disclosure Bulletin, vol. 32, No. 3A, pp. 295–299 (Aug. 1989).

*On–Line Real Time Modem Testing,* IBM Technical Disclosure Bulletin, vol. 20, No. 6, pp. 2252–2254 (Nov. 1977).

Pierobon, Gianfranco L., *Codes of Zero Spectral Density at Zero Frequency,* IEEE Transactions on Information Theory, vol. IT–30, No. 2, pp. 435–439 (Mar., 1984).

Marcus, Brian H, et al., *On Codes with Spectral Nulls at Rational Submultiples of the Symbol Frequency,* IEEE Transactions on Information Theory, vol. IT–33, No. 4, pp. 557–568 (Jul. 1987).

Fischer, Robert, et al., *Signal Mapping for PCM Modems,* ITU–Telecommunications Standardization Sector PCM '97–120, V.pcm Rapporteur Meeting, (Sunriver, Oregon; Sep. 4–12, 1997).

*Pulse Code Modulation (PCM) of Voice Frequencies,* ITU–T, Recommendation G.711 (Geneva, 1972).

*Series G: Digital Transmission Systems; Terminal equipments—Coding of analogue signals by pulse code modulation; Pulse code modulation (PCM) of voice frequencies,* ITU–T, Recommendation G.711 (Geneva, 1996).

*Data Communication Over the Telephone Network; Error–Correcting Procedures for DCEs Using Asynchronous–to–Synchronous Conversion,* ITU–T V.42 (03/93).

*Improvement to Spectral Shaping Technique,* Research Disclosure, V. 1, n415,41511, pp. 1550–1551 (Nov. 1998).

*TIA Standard Draft: North American Telephone Network Transmission Model for Evaluating Analog Client to Digitally Connected Server Modems,* Telecommunications Industry Association, PN3857,Draft 10 (Feb. 1999).

Davis, Gordon T., *DSP and MATLAB implementation of model–based constellation generation* (Sep. 18, 1998).

Woodruff, K.R, et al, *Automatic and Adaptive System and Efficient Communication in Noisy Communication Line Environments,* IBM Technical Disclosure Bulletin, vol. 24, No. 9, pp. 4627–4629 (Feb. 1982).

Godard, D., et al., *Decision Feedback Equalizer Stabilization in Adaptive Mode,* IBM Technical Disclosure Bulletin, vol. 24, No. 11A, pp. 5691–5692 (Apr. 1982).

Borgnis–Desbordes, P., et al., *Variable–Speed Data Transmission,* IBM Technical Disclosure Bulletin, vol. 27, No. 4A, pp. 2269–2270 (Sep. 1984).

Couland, G., et al., *Analog Wrap Self–Test in Modems During Retrain Operations,* IBM Technical Disclosure Bulletin, vol. 28, No. 6, p. 2457 (Nov. 1985.

Maddens, F., *Sixteen–State Forward Convolutional Encoder,* IBM Technical Disclosure Bulletin, vol. 28, No. 6, pp. 2466–2468 (Nov. 1985).

*Remote Modem–Type Self–Learning,* IBM Technical Disclosure Bulletin, vol. 28, No. 6, pp. 2398–2399 (Nov. 1985).

Maddens, F., *Sixteen–State Feedback Convolutional Encoder,* IBM Technical Disclosure Bulletin, vol. 28, No. 10, pp. 4212–4213 (Mar. 1986).

Bell, R. A., et al., *Automatic Speed Reduction and Switched Network Back–up,* IBM Technical Disclosure Bulletin, vol. 32, No. 1, pp. 154–157 (Jun. 1989).

Nobakht, R.A., *Trellis–Coded Modulation Coding Scheme for a 19/2 Kbps Modem,* IBM Technical Disclosure Bulletin, vol. 36, No. 11, pp. 167–170 (Nov. 1993).

Nobakht, R.A., *Unified Table Based Subset Decoder for the Viterbi Algorithm,* IBM Technical Disclosure Bulletin, vol. 37, No. 09, pp. 581–587 (Sep. 1994).

Nobakht, R.A., *Trellis Subset Decoder Algorithm Based on a Pattern Recognition Scheme,* IBM Technical Disclosure Bulletin, vol. 37, No. 10, pp. 693–697 (Oct. 1994).

Abbiate, J.C., et al, *Variable–Data Transmission Modem,* IBM Technical Disclosure Bulletin, vol. 17, No. 11, pp. 3301–3302 (Apr. 1975).

Barlet, J., et al., *Full Speed Recovery in High Speed Modems,* IBM Technical Disclosure Bulletin, vol. 23, No. 2, pp. 641–643 (Jul. 1980).

Dialog Abstract, *Sample rate converter for duplex modem,* European Patent No. 285413.

Dialog Abstract, *Two–speed full–duplex modem for telephone network,* PCT No. WO 8501407.

Dialog Abstract, *Digital data transmission system,* European Patent No. 124674.

Dialog Abstract, *Facsimile communication controller,* Japanese Publication No. 04–175060 (Jun. 23, 1992).

Dialog Abstract, *Picture communication equipment,* Japanese Publication No. 03–120954 (May 23, 1991).

Dialog Abstract, *Radio date transmission system,* Japanese Publication No. 01–179535 (Jul. 17, 1989).

Dialog Abstract, *Facsimile device,* Japanese Publication No. 57–164654 (Oct. 9, 1982).

Dialog Abstract, *Data repeater*, Japanese Publication No. 57–087255 (May 31, 1982).

Dialog Abstract, *Blinding training method for decision feedback equaliser having feed–forward and feedback filters*, European Patent No. 880253.

Dialog Abstract, *Processing method for distorted signal received by qam receiver*, European Patent No. 465851.

Dialog Abstract, *Establishing wireless communication channel*, PCT No. WO 9905820.

Dialog Abstract, *High–speed rate adaptive subscriber line digital data modem*, PCT No. WO 9830001.

Dialog Abstract, *Digital modem in digital modulation system*, Japanese Patent No. 8116341.

Dialog Abstract, *Communication equipment and radio communication adapter*, Japanese Publication No. 08–340289 (Dec. 24, 1996).

Dialog Abstract, *Data recording method*, Japanese Publication No. 05–089597 (Apr. 9, 1993).

Dialog Abstract, *Transmission control system for data communication and its modem equipment*, Japanese Publication No. 02–228853 (Sep. 11, 1990).

Chadwick, H., et al., Dialog Abstract, *Performance of a TDMA burst modem through a dual nonlinear satellite channel*, Fifth International Conference on Digital Satellite Communications, pp. 63–67 (Italy, Mar. 23–26, 1981).

Nussbaumer, H., Dialog Abstract, *Reducing the acquisition time in an automatic equalizer*, IBM Technical Disclosure Bulletin, vol. 18, No. 5, pp. 1465–1479 (Oct. 1975).

Uzunoglu, V., et al., Dialog Abstract, *Synchronous and the coherent phase–locked synchronous oscillators: new techniques in synchronization and tracking*, IEEE Transactions on Circuits and Systems, vol. 36, No. 7, pp. 997–1004 (Jul. 1989).

Minei, I., et al., Dialog Abstract, *High–speed Internet access through unidirectional geostationary satellite channels*, IEEE Journal on Selected Areas in Communications, vol. 17, No. 2, pp. 345–359 (Feb. 1999).

Ovadia, S., Dialog Abstract, *The effect of interleaver depth and QAM channel frequency offset on the performance of multichannel AM–VSB/256–QAM video lightwave transmission systems*, International Conference on Telecommunications: Bridging East and West Through Communications, vol. 1, pp. 339–343 (Greece, Jun. 21–25, 1998).

Johnson, R.W., et al., Dialog Abstract, *Error correction coding for serial–tone HG transmission*, Seventh International Conference on HF Radio Systems and Techniques, pp. 80–84 (United Kingdom, Jul. 7–10, 1997).

Karasawa, Y., et al., Dialog Abstract, *Cycle slip in clock recovery on frequency–selective fading channels*, IEEE Transactions on Communications, vol. 45, No. 3, pp. 376–383 (Mar. 1997).

Umehira, M., et al., Dialog Abstract, *Design and performance of burst carrier recovery using a phase compensated filter*, Transactions of the Institute of Electronics, Information and Communication Engineers, vol. J78B–II, No. 12, pp. 735–746 (Dec. 1995).

De Bot, P., et al., Dialog Abstract, *An example of a multiresolution digital terrestrial TV modem*, Proceedings of ICC '93—IEEE International Conference on Communications, vol. 3, pp. 1785–1790 (Switzerland, May 23–26, 1993).

Lei, Chen, et al., Dialog Abstract, *Single–tone HF high speed data modem*, Proceedings of TENCON '93—IEEE Region 10 International Conference on Computers, Communications and Automation, vol. 3, pp. 94–98 (China, Oct. 19–21, 1993).

Woerner, B.D., et al., Dialog Abstract, *Simulation issues for future wireless modems*, IEEE Communications, vol. 32, No. 7, pp. 42–53 (Jul. 1994).

Sato, T., et al., Dialog Abstract, *Vehicle terminal equipment with dedicated DSP*, Oki Technical Review, vol. 58, No. 144, pp. 49–52 (Jul. 1992).

Sato, T., et al., Dialog Abstract, *Protocol configuration and verification of an adaptive error control scheme over analog cellular networks*, IEEE Transactions on Vehicular Technology, vol. 41, No. 1, pp. 69–76 (Feb. 1992).

Tamm, Yu.A., Dialog Abstract, *The effect of suppressing harmonic interference using an adaptive equalizer*, Elektrosvyaz, vol. 45, No. 3, pp. 5–10 (Mach 1990).

Saleh, A.A.M., et al., Dialog Abstract, *An experimental TDMA indoor radio communications system using slow frequency hopping and coding*, IEEE Transactions on Communications, vol. 39, No. 1, pp. 152–162 (Jan., 1991).

Nergis, A., Dialog Abstract, *Optimum HF digital communication systems with block coding and interleaving techniques*, Proceedings of the 1990 Bilkent International Conference on New Trends in Communication, Control and Signal Processing, vol. 1, pp. 511–517 (Turkey, Jul. 2–5, 1990).

Kawamata, F., et al., Dialog Abstract, *An evaluation of voice codecs and facsimiles*, Review of the Communications Research Laboratory, vol. 36, pp. 69–73 (Mar. 1990).

Sato, T., et al., Dialog Abstract, *Error–free high–speed data transmission protocol simultaneously applicable to both wire and mobile radio channels*, 38th IEEE Vehicular Technology Conference: 'Telecommunications Freedom—Technology on the Move', pp. 489–496 (Jun. 15–17, 1988).

Dialog Abstract, *1200–bit/s cellular modem DLD03H*, Oki Technical Review, vol. 53, No. 127, pp. 70–72 (Jul. 1987).

Chamberlin, J.W., et al., Dialog Abstract, *Design and field test of a 256–QAM DIV modem*, IEEE Journal on Selected Areas in Communications, vol. SAC–5, No. 3, pp. 349–356 (Apr. 1987).

De Cristofaro, R., et al., Dialog Abstract, *A 120 Bv/s QPSK modem designed for the INTELSAT TDMA network*, International Journal of Satellite Communications, vol. 3, Nos. 1–2, pp. 145–160 (Jan.Jun., 1985).

Shumate, A., Dialog Abstract, *Error correction coding for channels subject to occasional losses of bit count integrity*, IEEE Military Communications Conference, vol. 1, pp. 89–93 (Oct. 21–24, 1984).

Suyderhoud, H., et al., Dialog Abstract, *Investigation of 9.6 kb/s data transmission via a PCM link at 64 kb/s with and without link errors*, International Journal of Satellite Communications, vol. 2, No. 1, pp. 81–87 (Jan.–Mar., 1984).

Smith, C., Dialog Abstract, *Relating the performance of speech processors to the bit error rate*, Speech Technology, vol. 2, No. 1, pp. 41–53 (Sep.–Oct. 1983).

Suyderhoud, H., et al., Dialog Abstract, *Investigation of 9.6–kbit/s data transmission via a PCM link at 64 kbit/s with and without link errors*, Sixth International Conference on Digital Satellite Communications Proceedings, pp. 26–33 (Sep. 19, 23, 1983).

Kittel, L., Dialog Abstract, *Analogs and discrete channel models for signal transmission in mobile radio, Frequenz,*, vol. 36, Nos. 4–5, pp. 153–160 (Apr.–May 1982).

Farrell, P.G., et al., Dialog Abstract, *Soft–decision error control of h.f. data transmission, IEE Proceedings F (Communications, Radar and Signal Processing)*, vol. 127, No. 5, pp. 389–400 (Oct. 1980).

Johnson, A.L., Dialog Abstract, *Simulation and implementation of a modulation system for overcoming ionospheric scintillation fading, AGARD Conference Proceedings No. 173 on Radio Systems and the Ionosphere*, pp. 3/1–5 (Greece, May 26–30, 1975).

Matsumura, K., et al., Dialog Abstract, *Anti–interference data–transmission set of HF radio equipment, Mitsublishi Electric Engineer*, No. 41, pp. 18–23 (Sep., 1974).

Blank, H.A., et al., Dialog Abstract, *A Markov error channel model, 1973 National Telecommunications Conference*, vol. 1, pp. 15B/1–8 (Nov. 26–28, 1973).

McGruther, W.G., Dialog Abstract, *Long term error performance data for operation at 2400 bps ona nonswitched private line network, Summaries of papers presented at 1970 Canadian symposium on communications*, pp. 65–66 (Canada, Nov. 12–13, 1970).

Burton, H.O., et al., Dialog Abstract, *On the use of error statistics from data transmission on telephone facilities to estimate performance of forward–error–correction, 1970 international conference on communications*, p. 21 (Jun. 8–10, 1970).

Bowen, R.R., Dialog Abstract, *Application on burst error correction codes to data modems for dispersive channels, Proceedings of the 1970 international symposium on information theory*, p. 1 (Netherlands, Jun. 15–19, 1970).

Pierce, A.W., et al., Dialog Abstract, *Effective application of forward–acting error–control coding to multichannel h.f. data modems, IEEE Transactions on Communication Technology*, vol. Com–18, No. 4, pp. 281–294 (Aug. 1970).

West, R.L., Abstract, *Data Concentration Method, IBM Technical Disclosure Bulletin*, pp. 487–489; http://w3.infogate.ibm.com:1207/SESS506884/GETDOC/39/2/1 (Jul., 1975).

Haas, L.C., et al., Abstract, *Received Line Signal Quality Analysis, IBM Technical Disclosure Bulletin*, pp. 5414–5416; http://w3.infogate.ibm.com:1207/SESS506884/GETDOC/43/1/1 (May, 1981).

Nussbaumer, H., Abstract, *Reducing the Acquisition Time in an Automatic Equalizer, IBM Technical Disclosure Bulletin*, pp. 1465–1479; http://w3.infogate.ibm.com:1207/SESS506884/GETDOC/40/2/1 (Oct. 1975).

Dialog Abstract, *Listener echo canceller for digital communication system*, PCT No. WO 9310607.

Dialog Abstract, *Reduced time remote access method for modem computer*, PCT No. WO 9209165.

* cited by examiner

SYSTEMS, METHODS AND COMPUTER PROGRAM PRODUCTS FOR IDENTIFYING DIGITAL IMPAIRMENTS IN MODEMS BASED ON CLUSTERS AND/OR SKIPS IN PULSE CODE MODULATION SIGNAL LEVELS

FIELD OF THE INVENTION

This invention relates to modems, and more particularly to start-up signals and sequences for modems.

BACKGROUND OF THE INVENTION

The demand for remote access to information sources and data retrieval, as evidenced by the success of services such as the World Wide Web, is a driving force for high-speed network access technologies. Today's telephone network offers standard voice services over a 4 kHz bandwidth. Traditional analog modem standards generally assume that both ends of a modem communication session have an analog connection to the Public Switched Telephone Network (PSTN). Because data signals are typically converted from digital to analog when transmitted towards the PSTN and then from analog to digital when received from the PSTN, data rates may be limited to 33.6 kbps as defined in the V.34 transmission recommendation developed by the International Telecommunications Union (ITU).

The need for an analog modem can be eliminated, however, by using the Basic Rate Interface (BRI) of the Integrated Services Digital Network (ISDN). A BRI offers end-to-end digital connectivity at an aggregate data rate of 160 kbps, which is comprised of two 64 kbps B channels, a 16 kbps D channel, and a separate maintenance channel. ISDN can offer comfortable data rates for Internet access, telecommuting, remote education services, and some forms of video conferencing. ISDN deployment, however, has been very slow due at least in part to the substantial investment for new equipment. Because ISDN presently is not very pervasive in the PSTN, the network providers have typically tarriffed ISDN services at relatively high rates, which may be ultimately passed on to the ISDN subscribers. In addition to the high service costs, subscribers must generally purchase or lease network termination equipment to access the ISDN.

While most subscribers do not enjoy end-to-end digital connectivity through the PSTN, the PSTN is nevertheless mostly digital. Typically, the only analog portion of the PSTN is the phone line or local loop that connects a subscriber or client modem (e.g., an individual subscriber in a home, office, or hotel) to the telephone company's Central Office (CO). In recent years, local telephone companies have been replacing portions of their original analog networks with digital switching equipment. Nevertheless, the connection between the home and the CO generally has been the slowest to change to digital as discussed in the foregoing with respect to ISDN BRI service.

A recent data transmission recommendation issued by the ITU, known as V.90, takes advantage of the digital conversions that have been made in the PSTN. By viewing the PSTN as a digital network, V.90 technology is able to accelerate data downstream from the Internet or other information source to a subscriber's computer at data rates of up to 56 kbps, even when the subscriber is connected to the PSTN via an analog local loop.

To understand how the V.90 recommendation achieves this higher data rate, it may be helpful to briefly review the operation of V.34 analog modems. V.34 modems are optimized for the situation where both ends of a communication session are connected to the PSTN by analog lines. Even though most of the PSTN is digital, V.34 modems treat the network as if it were entirely analog. Moreover, the V.34 recommendation assumes that both ends of the communication session suffer impairment due to quantization noise introduced by analog-to-digital converters. That is, the analog signals transmitted from the V.34 modems are sampled at 8000 times per second by a codec upon reaching the PSTN, with each sample being represented or quantized by an eight-bit pulse code modulation (PCM) codeword. The codec uses 256, non-uniformly spaced, PCM quantization levels defined according to either the $\mu$-law or A-law companding standard (i.e. the ITU G.711 Recommendation).

Because the analog waveforms are continuous and the binary PCM codewords are discrete, the digits that are sent across the PSTN can only approximate the original analog waveform. The difference between the original analog waveform and the reconstructed quantized waveform is called quantization noise, which can limit the modem data rate.

While quantization noise may limit a V.34 communication session to 33.6 kbps, it nevertheless affects only analog-to-digital conversions. The V.90 standard relies on the lack of analog-to-digital conversions in the downstream path, outside of the conversion made at the subscriber's modem, to enable transmission at 56 kbps.

The general environment for which the V.90 standard was developed is depicted in FIG. 1. An Internet Service Provider (ISP) 22 is connected to a subscriber's computer 24 via a V.90 digital server modem 26, through the PSTN 28 via digital trunks (e.g., T1, E1 and/or ISDN Primary Rate Interface (PRI) connections), through a central office switch 32, and finally through an analog loop to the client modem 34. The central office switch 32 is drawn outside of the PSTN 28 to better illustrate the connection of the subscriber's computer 24 and modem 34 into the PSTN 28. It should be understood that the central office 32 generally is, in fact, a part of the PSTN 28. Operation of a communication session between the subscriber 24 and an ISP 22 is best described with reference to the more detailed block diagram of FIG. 2.

Referring to FIG. 2, transmission from the server modem 26 to the client modem 34 will be described first. The information to be transmitted is first encoded using only the 256 PCM codewords used by the digital switching and transmission equipment in the PSTN 28. These PCM codewords are transmitted towards the PSTN by the PCM transmitter 36 where they are received by a network codec. The PCM data is then transmitted through the PSTN 28 until reaching the central office 32 to which the client modem 34 is connected. Before transmitting the PCM data to the client modem 34, the data is converted from its current form as either $\mu$-law or A-law companded PCM codewords to Pulse Amplitude Modulated (PAM) voltages by the codec expander (digital-to-analog (D/A) converter) 38. These PAM voltage levels are processed by a central office hybrid 42 where the unidirectional signal received from the codec expander 38 is transmitted towards the client modem 34 as part of a bidirectional signal. A second hybrid 44 at the subscriber's analog telephone connection converts the bidirectional signal back into a pair of unidirectional signals.

Finally, the analog signal from the hybrid 44 is converted into digital PAM samples by an analog-to-digital (A/D) converter 46, which are received and decoded by the PAM receiver 48. Note that for transmission to succeed effectively at 56 kbps, there should be only a single digital-to-analog conversion and subsequent analog-to-digital conversion between the server modem 26 and the client modem 34. Recall that analog-to-digital conversions in the PSTN 28 can introduce quantization noise, which may limit the data rate as discussed hereinbefore. The A/D converter 46 at the client modem 34, however, may have a higher resolution than the A/D converters used in the analog portion of the PSTN 28 (e.g. 16 bits versus 8 bits), which results in less quantization noise. Moreover, the PAM receiver 48 preferably is in synchronization with the 8 kHz network clock to properly decode the digital PAM samples.

Transmission from the client modem 34 to the server modem 26 follows the V.34 data transmission standard. That is, the client modem 34 includes a V.34 transmitter 52 and a D/A converter 54 that encode and modulate the digital data to be sent using techniques such as Quadrature Amplitude Modulation (QAM). The hybrid 44 converts the unidirectional signal from the digital-to-analog converter 54 into a bidirectional signal that is transmitted to the central office 32. Once the signal is received at the central office 32, the central office hybrid 42 converts the bidirectional signal into a unidirectional signal that is provided to the central office codec. This unidirectional, analog signal is converted into either $\mu$-law or A-law companded PCM codewords by the codec compressor (A/D converter) 56, which are then transmitted through the PSTN 28 until reaching the server modem 26. The server modem 26 includes a conventional V.34 receiver 58 for demodulating and decoding the data sent by the V.34 transmitter 52 in the client modem 34. Thus, data is transferred from the client modem 34 to the server modem 26 at data rates of up to 33.6 kbps as provided for in the V.34 standard.

Thus, the V.90 standard offers increased data rates (e.g., data rates up to 56 kbps) in the downstream direction from a server to a subscriber or client. Upstream communication still generally takes place at conventional data rates as provided for in the V.34 standard. Nevertheless, this asymmetry is particularly well suited for Internet access. For example, when accessing the Internet, high bandwidth generally is most useful when downloading large text, video, and audio files to a subscriber's computer. Using V.90, these data transfers can be made at up to 56 kbps. On the other hand, traffic flow from the subscriber to an ISP generally includes mainly keystroke and mouse commands, which are readily handled by the conventional rates provided by V.34.

As described above, the digital portion of the PSTN 28 transmits information using eight-bit PCM codewords at a frequency of 8000 Hz. Thus, it would appear that downstream transmission should take place at 64 kbps rather than 56 kbps as defined by the V.90 standard. While 64 kbps is a theoretical maximum, several factors may prevent actual transmission rates from reaching this ideal rate. First, even though the problem of quantization error can be substantially eliminated by using PCM encoding and PAM for transmission, additional noise in the network or at the subscriber premises, such as non-linear distortion and crosstalk, can limit the maximum data rate. Furthermore, the $\mu$-law or A-law companding techniques generally do not use uniform PAM voltage levels for defining the PCM codewords. The PCM codewords representing very low levels of sound have PAM voltage levels spaced close together. Noisy transmission facilities can prevent these PAM voltage levels from being distinguished from one another thereby causing loss of data. Accordingly, to provide greater separation between the PAM voltages used for transmission, not all of the 256 PCM codewords may be used.

It is generally known that, assuming a convolutional coding scheme, such as trellis coding, is not used, the number of symbols to transmit a certain data rate is given by Equation 1:

$$bps=R_s\log_2 N_s \qquad \text{EQ. 1}$$

where bps is the data rate in bits per second, $R_s$ is the symbol rate, and $N_s$ is the number of symbols in the signaling alphabet or constellation. To transmit at 56 kbps using a symbol rate of 8000, Equation 1 can be rewritten to solve for the number of symbols required as set forth below in Equation 2:

$$N_s=2^{56000/8000}=128 \qquad \text{EQ. 2}$$

Thus, the 128 most robust codewords of the 256 available PCM codewords generally are chosen for transmission as part of the V.90 standard.

Successful operation of a V.90 receiver may depend on an accurate identification of the reference PAM signaling levels that are often called the signaling alphabet or the signal constellation. The digital samples that are filtered by a decision feedback equalizer are provided to a slicer/detector where the samples are compared against the signaling alphabet. A determination is made with regard to which member of the alphabet or which point in the constellation the digital sample falls closest to. Once the alphabet member is identified, the PCM code word corresponding to that alphabet member is selected as the symbol transmitted for that digital sample.

While a set of ideal signaling levels can be defined for the signaling alphabet, the effective alphabet typically will deviate from these ideal levels because of underlying digital impairments resulting from Robbed Bit Signaling (RBS) and/or digital attenuation PADs. RBS is a mechanism utilized in the digital transport system, such as a T1 trunk, for signal control and status information between network equipment. PAD is similarly found in the digital transport system for the purpose of adjusting signal levels for different analog and digital equipment. Since these impairments will likely be chronic throughout the communication session, it may be more efficient for the modem to learn a new signaling alphabet that takes these impairments into account.

Accordingly, the V.90 standard specifies that during Phase 3 of the startup procedure that is carried out after establishing a dialed connection between the client and server modems, digital impairment learning will take place. During digital impairment learning, a plurality of sets of DIL signals, each corresponding to a set of PCM signals, is repeatedly transmitted from a server modem to a client modem during a corresponding plurality of DIL intervals, also referred to as framing intervals. For example, six DIL intervals may be provided during which all or a selected subset of the PCM levels for the constellation are transmitted. The plurality of DIL intervals may be repeated until the RBS and PAD digital impairments are identified. The PAD and RBS digital impairments so identified are then used in the Phase 4 final training procedures for the V.90 modem.

Unfortunately, the identification of RBS and PAD digital impairments may be difficult because of the many types of RBS and the many levels of PAD digital impairments that may be present in a telephone network. RBS and PAD identification also may be difficult due to the combinations of one or more PADs and/or RBS that may be present in a given network.

For example, RBS can manifest itself when the Least Significant Bit (LSB) of a PCM code word in a particular DIL interval is forced to a one. This operation has the effect of collapsing neighboring PCM code words with even and odd values into the odd value PCM code word. Other types of RBS variations are possible, and different DIL intervals may be subject to different types of RBS.

The effect of PADs generally is present in all six DIL intervals. A PAD also can result in multiple PCM code words collapsing into a single code word. Although this may not cause a problem for voice transmission, it may produce great difficulty for data transmission. PADs generally are not standardized and several quantization rules can be used for implementing a given PAD attenuation.

Accordingly, it is desirable to provide improved systems, methods and/or computer program products for identifying RBS and PAD digital impairments in the DIL signals that are repeatedly transmitted from a server modem to a client modem during a corresponding plurality of DIL intervals.

SUMMARY OF THE INVENTION

Systems, methods and computer program products according to the invention can identify digital impairments in a set of Pulse Code Modulation (PCM) signal levels that are received at a client modem from a server modem, by compressing the set of PCM signal levels into a signature. Digital impairments are determined based on the signature. In a preferred embodiment, the PCM signal levels are compressed into a signature by identifying clusters and/or skips in the set of PCM signal levels. A digital impairment in the set of PCM signal levels is determined based on the clusters and/or skips so identified.

The invention stems from a realization that when transmitting PCM signal levels from a server modem to a client modem over a connection that is subject to digital impairments such as Robbed Bit Signaling (RBS) and/or PAD digital impairments, and also is subject to quantization, some adjacent PCM signal levels may become identical or very close to one another. Moreover, other adjacent signal levels may have a difference that is at least approximately twice the difference of other levels. The former phenomenon is referred to as a "cluster" and the latter phenomenon is referred to as a "skip". By identifying clusters and/or skips in the set of PCM signals that are received at the client modem from the server modem, a signature of the network connection may be obtained. Digital impairments including RBS and/or PAD may be identified using the signature.

More specifically, according to the invention, clusters and/or skips in the set of PCM signal levels that are received at the client modem from the server modem are counted. The digital impairment then may be determined based on the counts of the clusters and/or skips. A listing of cluster and/or skip counts for a plurality of digital impairment scenarios may be obtained. The clusters and/or skips that are counted in the set of PCM signal levels that are received at the client modem are compared to the listings of cluster and/or skip counts for the plurality of digital impairment scenarios, preferably to identify a closest match. The listings of clusters and/or skips may be obtained by computing cluster counts and/or skip counts for an ideal set of PCM signal levels that is subject to a digital impairment scenario and quantization.

In identifying clusters and/or skips, not all the PCM signal levels need be investigated. Rather, only a subset of the set of PCM signal levels may be investigated, wherein the lowest levels may be discarded to reduce the effect of random noise, and the highest levels may be discarded to reduce the effect of nonlinear distortions. Moreover, in identifying a cluster, identical signals need not be identified. Rather, adjacent PCM signal levels that are within a first threshold of one another may be identified. Similarly, in order to identify skips, adjacent signals having a space therebetween that is at least twice the average need not be identified. Rather, adjacent signal levels that are at least a second threshold apart from one another may be identified.

In preferred embodiments of the invention, cluster and/or skip counting is performed on a plurality of sets of Digital Impairment Learning (DIL) signals that repeatedly are transmitted from the server modem to the client modem over a corresponding plurality of DIL intervals. The clusters and/or skips may be counted in the plurality of sets of DIL signals and counts for clusters and/or skips for at least two of the DIL intervals may be averaged.

In preferred embodiments that can identify RBS and/or PAD digital impairments, the DIL intervals that are not subject to RBS may be determined based on the cluster and/or skip counts. Then, the counts of clusters and/or skips for the DIL intervals that are not subject to RBS may be averaged. PAD impairments then may be determined from the average counts of clusters and/or skips.

The present invention can efficiently identify digital impairments because it can base the identification on a compressed signature of the PCM signal levels, that preferably is derived from clusters and/or skips therein, rather than manipulating the entire set of PCM signal levels to identify digital impairments. Moreover, the present invention need not rely on a priori knowledge of a precise network model of the digital impairments. Rather, when an unknown network model is encountered, digital impairments may be identified by identifying the closest known network signature based on clusters and/or skips, and/or by interpolating between a range of known network signatures based on clusters and skips. It also will be understood that the present invention may be provided as modem-related systems, methods and/or computer program products.

DETAILED DESCRIPTION OF PREFERRED EMBODIMENTS

Figure 1:
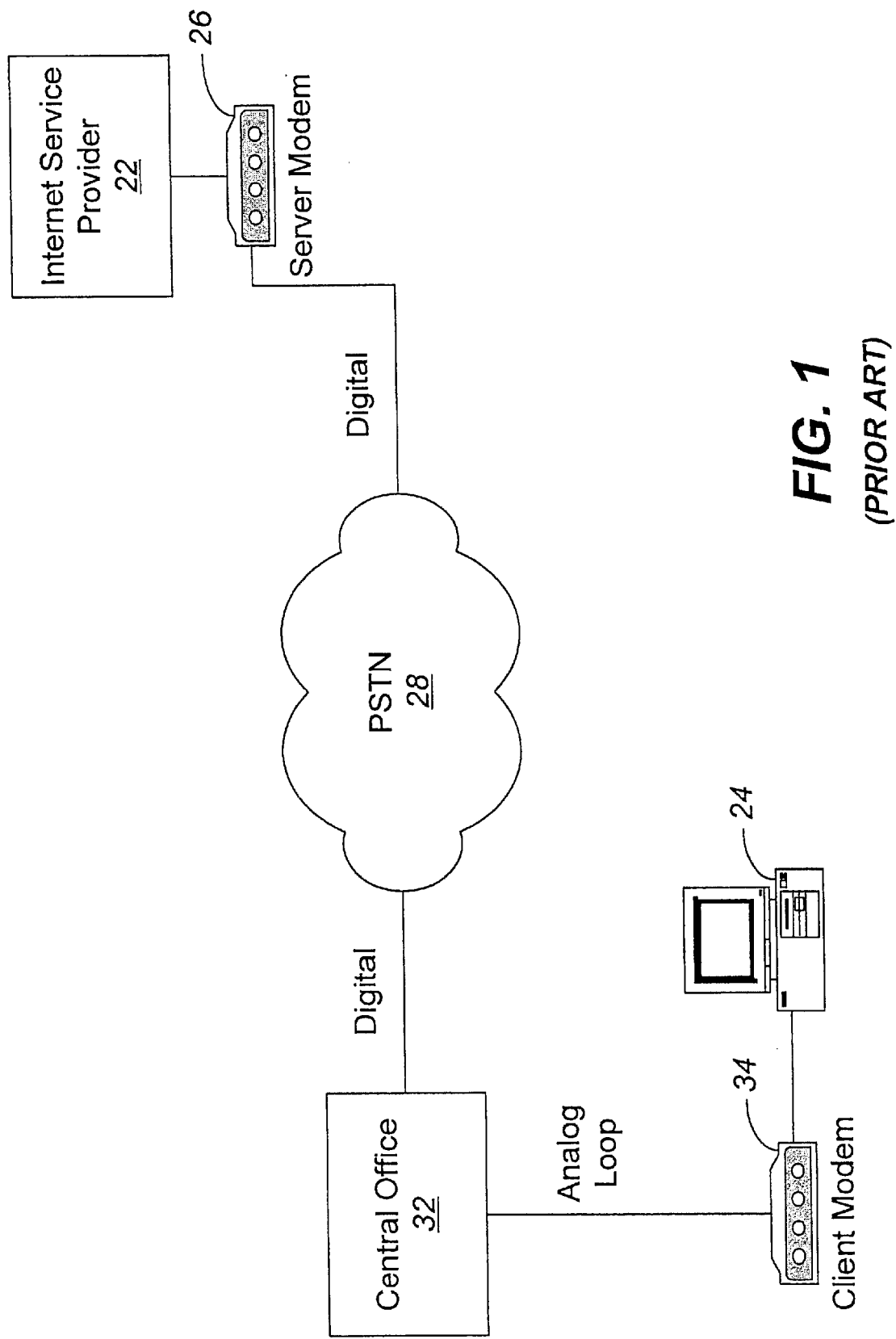
FIG. 1 is a block diagram of a conventional network using client and server modems.
Figure 2:
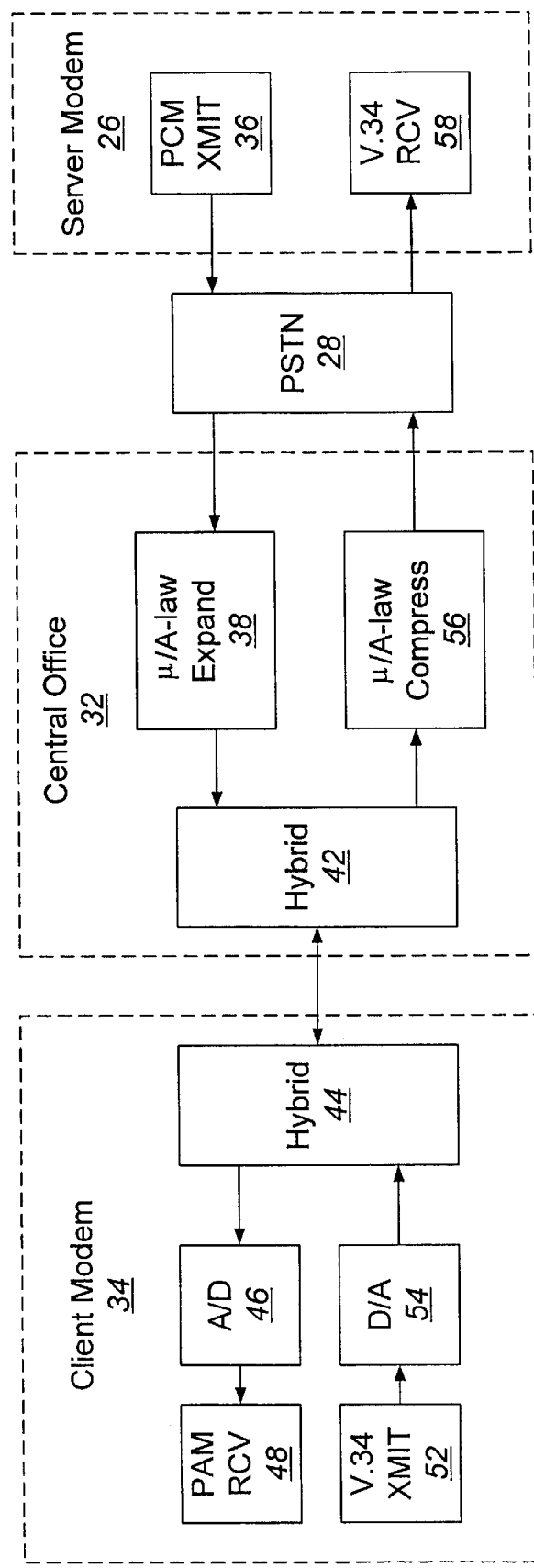
FIG. 2 is a more detailed block diagram of a network of FIG. 1.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

As will be appreciated by those skilled in the art, the present invention can be embodied as a method, a digital signal processing system, and/or a computer program product. Accordingly, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable program code embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a Random Access Memory (RAM), a Read-Only Memory (ROM), an Erasable Programmable Read-Only Memory (EPROM or Flash memory), an optical fiber, and a portable Compact Disc Read-Only Memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention may be written in a high level programming language such as C or C++. Nevertheless, some modules or routines may be written in assembly or machine language to optimize speed, memory usage, or layout of the software or firmware in memory. Assembly language may be used to implement time-critical code segments. In a preferred embodiment, the present invention uses assembly language to implement most software programs. It should further be understood that the program code for carrying out operations of the present invention may also execute entirely on a client modem, partly on a client modem, partly on a client modem and partly on a server modem, or partly in a client modem, partly in a server modem, and partly in the PSTN.

High Level Description

Figure 3:
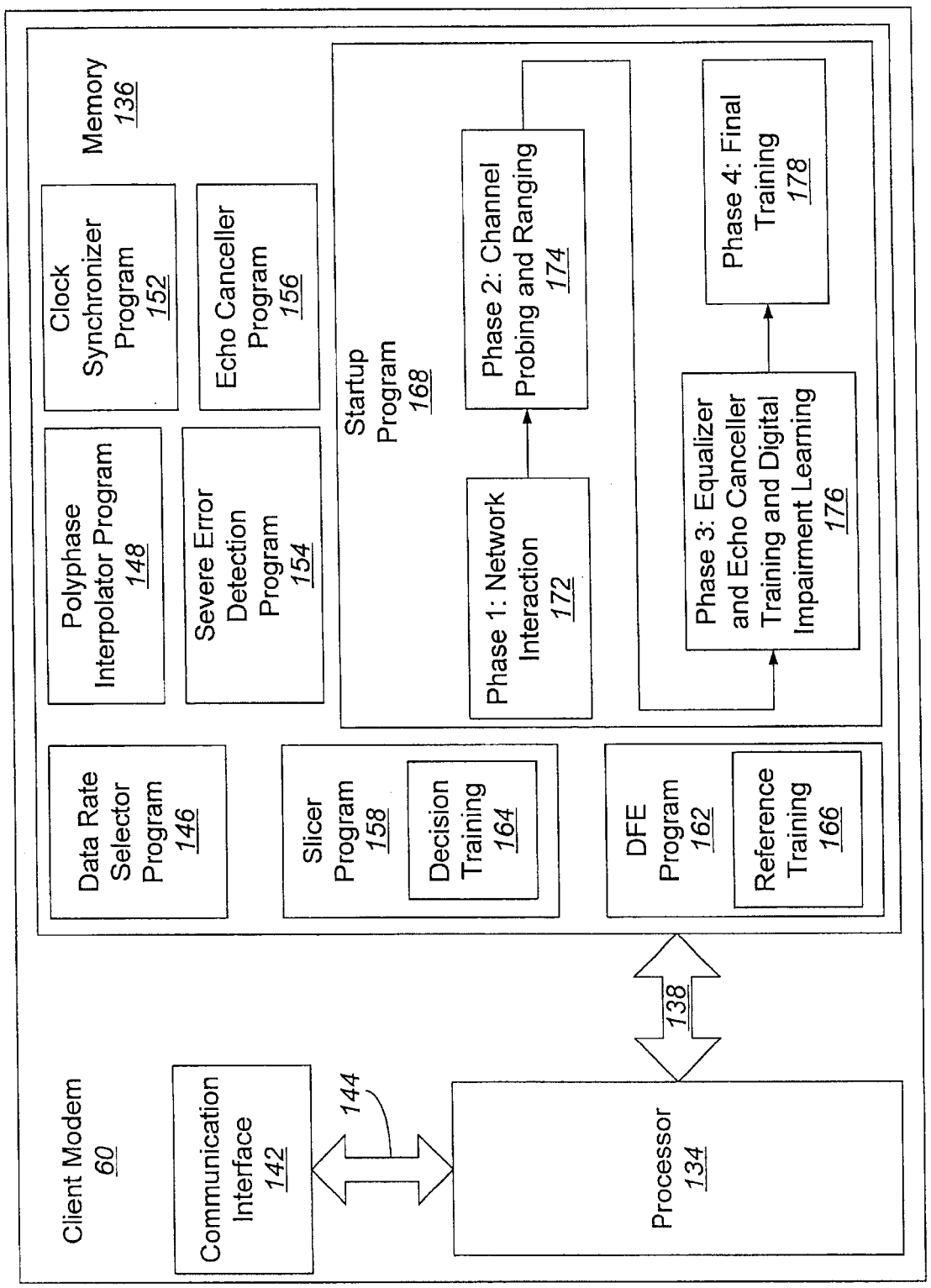
FIG. 3 is a block diagram of a client modem according to an embodiment of the present invention.

Referring now to FIG. 3, a block diagram of a client modem 60 according to the present invention is shown. The client modem 60 includes a processor 134, preferably a digital signal processor, which communicates with a memory 136 via an address/data bus 138. In addition, the processor 134 can receive and transmit information to external devices via a communication interface 142, which is accessed through input/output (I/O) bus 144. The processor 134 can be any commercially available or custom processor, preferably suitable for a real-time intensive embedded application.

The memory 136 is representative of the overall hierarchy of memory devices containing the software and data used to implement the functionality of the V.90 client modem 60. The memory 136 can include, but is not limited to, the following types of devices: cache, ROM, PROM, EPROM, EEPROM, flash, SRAM, and DRAM. As shown in FIG. 3, the memory 136 can include program modules for implementing the functionality of the components of the client modem 60. Preferably, the memory 136 can include a data rate selector program module 146, a polyphase interpolator program module 148, a clock synchronizer program module 152, a severe error detector program module 154, an echo canceller program module 156, a slicer program module 158, and a Decision Feedback Equalizer (DFE) program module 162. The slicer program module 158 and the DFE program module 162 preferably include a decision training program sub-module 164 and a reference training program sub-module 166 respectively, which are used for signaling alphabet identification. These program modules and sub-modules can operate independent of the present invention, and need not be described further herein.

The memory 136 further includes a startup program module 168 which implements the multi-phase startup protocol defined in the V.90 recommendation. More specifically, the startup program module 168 includes a Phase 1: Network Interaction module 172 and a Phase 2: Channel Probing and Ranging module 174. These modules are described in the V.90 standard, and need not be described further herein. As also shown in FIG. 3, a Phase 3: Equalizer and Echo Canceller Training and Digital Impairment Learning module 176 is provided. As will be described in detail below, the present invention can provide improved digital impairment learning for the Phase 3 module 176. Finally, a Phase 4: Final Training module 178 is provided, as is described in the V.90 specification. Other modules also may be included in the startup program 168, which need not be described in detail herein.

The present invention is described with reference to block diagrams and flowchart illustrations of methods, apparatus (systems), and computer program products according to an embodiment of the invention. It will be understood that each block of the block diagrams and flowchart illustrations, and combinations of blocks, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

During startup of a V.90 modem, the analog modem receiver performs signaling alphabet identification. This can be performed, for example, during DIL signal reception, in which pre-specified signal levels are received in each of a plurality, such as six, of DIL intervals. The learned signal levels (and the corresponding ucodes) may be stored in memory for use in determining the combination of digital impairments present in the network. The digital impairments of interest include PADs and RBS impairments. The PAD level and the type of RBS can also be determined.

In the digital network, the PAD and RBS impairments can be encountered in a variety of combinations, which can change from connection to connection. In a particular DIL interval, one can encounter no PAD and no RBS, RBS only, PAD only, RBS followed by PAD, PAD followed by RBS, RBS followed by PAD followed by RBS and/or multiple PADs with possible RBS before, between, and/or after PADs. Multiple PADs also are referred to as tandem PADs. Note that typically, PADs affect all six DIL intervals in the same manner, while different RBS types can be present in different DIL intervals.

The present invention stems from a realization that clusters and/or skips in the PCM signal levels may be used to provide a compressed signature of digital impairments including RBS and PAD in a connection between a client modem and a server modem. PCM codes and corresponding analog levels used in the telephone network are defined in ITU Standard G.711. Digital impairments generally involve many mapping rules of PCM codes from one level to another. According to the invention, when mapping these codes after digital impairment, some adjacent codes become identical or close to one another to define a cluster, and the spaces between some of the codes are about twice or about three or more times the expected value to define a skip. The present invention uses these clusters and/or skips, and preferably counts of clusters and skips, to define a signature for the digital impairment.

For example, Table 1 provides the mapping results of ucodes 1 to 108 with 0 dB (original ucodes), 3 dB and 6 dB PAD. Table 1 shows that there are some spaces that drop to zero, for example between codes 77 and 78 in the 3 dB case, and codes 44 and 45 in the 6 dB case. Moreover, some spaces become twice the normal expectation, for example codes 83 and 84 in the 3 dB case. In Table 1, clusters are identified by brackets to the right of the values, whereas skips are identified by brackets to the left of the values. As shown in Table 1, there are twelve clusters and eleven skips in the 3 dB PAD case, and four clusters and no skips in the 6 dB PAD case from codes 32 to 108. By definition, there are no clusters or skips in the 0 dB case. Thus, different PADs may have different numbers of cluster and/or skip counts. Therefore, the count information may be used to classify the digital impairments in the network.

TABLE 1

| Ucode level | 0 dB | 3 dB | 6 Db |
|---|---|---|---|
| 1 | 8 | 12] | 16] |
| 2 | 16 | 12] | 16] |
| 3 | 24 | 23 | 32] |
| 4 | 32 | 35 | 32] |
| 5 | 40 | 46] | 48] |
| 6 | 48 | 46] | 48] |
| 7 | 56 | 58 | 64] |
| 8 | 64 | 69] | 64] |
| 9 | 72 | 69] | 80] |
| 10 | 80 | 81 | 80] |
| 11 | 88 | 92 | 96] |
| 12 | 96 | 104] | 96] |
| 13 | 104 | 104] | 112] |
| 14 | 112 | 115 | 112] |
| 15 | 120 | 127 | 128] |
| 16 | 132 | 138 | 128] |
| 17 | 148 | [150 | 144 |

TABLE 1-continued

| Ucode level | 0 dB | 3 dB | 6 Db |
|---|---|---|---|
| 18 | 164 | [173 | 160 |
| 19 | 180 | 190] | 176 |
| 20 | 196 | 190] | 192 |
| 21 | 212 | 213 | 208 |
| 22 | 228 | 236 | 224 |
| 23 | 244 | 259] | 240 |
| 24 | 260 | 259] | 264] |
| 25 | 276 | 282 | 264] |
| 26 | 292 | 305] | 296] |
| 27 | 308 | 305] | 296] |
| 28 | 324 | 328 | 328] |
| 29 | 340 | 351 | 328] |
| 30 | 356 | 374] | 360] |
| 31 | 372 | 374] | 360] |
| 32 | 396 | [397 | 392 |
| 33 | 428 | [443 | 424 |
| 34 | 460 | [466 | 456 |
| 35 | 492 | [513 | 489 |
| 36 | 524 | 536 | 521 |
| 37 | 556 | 570 | 553 |
| 38 | 588 | 616] | 585 |
| 39 | 620 | 616] | 617 |
| 40 | 652 | 662 | 649 |
| 41 | 684 | 708] | 681 |
| 42 | 716 | 708] | 713 |
| 43 | 748 | 754 | 745 |
| 44 | 780 | 800 | 793] |
| 45 | 812 | 847] | 793] |
| 46 | 844 | 847] | 857[ |
| 47 | 876 | 893 | 857] |
| 48 | 924 | 939 | 921 |
| 49 | 988 | [985 | 985 |
| 50 | 1052 | [1077 | 1049 |
| 51 | 1116 | [1123 | 1113 |
| 52 | 1180 | [1215 | 1177 |
| 53 | 1244 | 1261 | 1241 |
| 54 | 1308 | 1330 | 1305 |
| 55 | 1372 | 1422] | 1369 |
| 56 | 1436 | 1422] | 1434 |
| 57 | 1500 | 1515 | 1498 |
| 58 | 1564 | 1607 | 1562 |
| 59 | 1628 | 1699] | 1626 |
| 60 | 1692 | 1699] | 1690 |
| 61 | 1756 | 1791 | 1754 |
| 62 | 1820 | 1883] | 1850] |
| 63 | 1884 | 1883] | 1850] |
| 64 | 1980 | [1975 | 1978 |
| 65 | 2108 | [2160 | 2106 |
| 66 | 2236 | [2252 | 2234 |
| 67 | 2364 | [2436 | 2363 |
| 68 | 2492 | [2528 | 2491 |
| 69 | 2620 | [2712 | 2619 |
| 70 | 2748 | 2851] | 2747 |
| 71 | 2876 | 2851] | 2875 |
| 72 | 3004 | 3035 | 3003 |
| 73 | 3132 | 3219 | 3131 |
| 74 | 3260 | 3403] | 3259 |
| 75 | 3388 | 3403] | 3388 |
| 76 | 3516 | 3588 | 3516 |
| 77 | 3644 | 3772] | 3644 |
| 78 | 3772 | 3772] | 3772 |
| 79 | 3900 | 3956 | 3964 |
| 80 | 4092 | [4141 | 4220 |
| 81 | 4348 | [4509 | 4477 |
| 82 | 4604 | 4693 | 4733 |
| 83 | 4860 | [4878 | 4989 |
| 84 | 5116 | [5246 | 5246 |
| 85 | 5372 | 5431 | 5502 |
| 86 | 5628 | 5615 | 5758 |
| 87 | 5884 | 5891 | 6014 |
| 88 | 6140 | 6260 | 6271 |
| 89 | 6396 | 6628] | 6527 |
| 90 | 6652 | 6628] | 6783 |
| 91 | 6908 | 6997 | 7039 |
| 92 | 7164 | 7365 | 7296 |
| 93 | 7420 | 7734] | 7552 |
| 94 | 7676 | 7734] | 7808] |

TABLE 1-continued

| Ucode level | 0 dB | 3 dB | 6 Db |
|---|---|---|---|
| 95 | 7932 | 8103 | 7808⌋ |
| 96 | 8316 | 8471 | 8193 |
| 97 | 8828 | ⌈8840 | 8705 |
| 98 | 9340 | ⌊9577 | 9218 |
| 99 | 9852 | ⌈9945 | 9730 |
| 100 | 10364 | ⌊10683 | 10243 |
| 101 | 10876 | 11051 | 10755 |
| 102 | 11388 | 11420 | 11268 |
| 103 | 11900 | 11973 | 11780 |
| 104 | 12412 | 12710 | 12293 |
| 105 | 12924 | 13447⌉ | 12806 |
| 106 | 13436 | 13447⌋ | 13318 |
| 107 | 13948 | 14184 | 13831 |
| 108 | 14460 | 14921 | 14343 |

Figure 4:
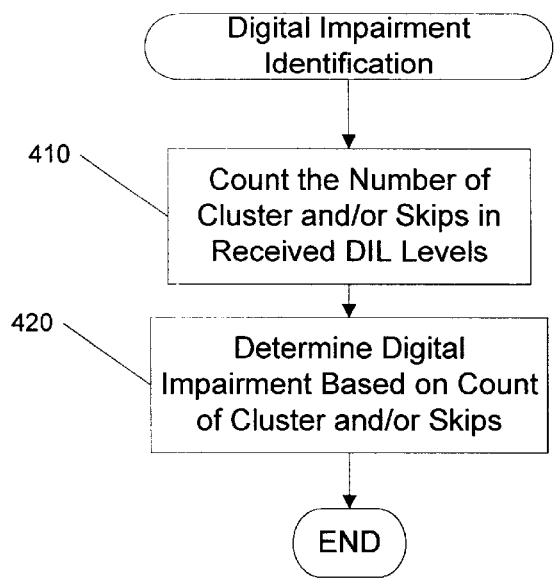
FIG. 4 is a flowchart illustrating operations for identifying digital impairments according to an embodiment of the present invention.

FIG. 4 is a flowchart illustrating overall systems, methods and computer program products for identifying digital impairments according to an embodiment of the invention. Although the digital impairments may be identified in any set of PCM signals that are received at a client modem from a server modem, they preferably are identified in a plurality of sets of DIL signals that are repeatedly transmitted from the server modem to the client modem over a corresponding plurality of DIL intervals.

As shown at Block 410, the number of clusters and/or skips in the received DIL levels are counted or accumulated. In particular, the spacing between points in the G.711 curves may be identified in all six DIL intervals. All of the DIL levels may be analyzed. However, preferably, codes of less than 32 and of more than 108 may be discarded so as not to consider codes that are unduly affected by noise or nonlinear distortion, respectively. When analyzing the spacing between adjacent DIL levels, it can be determined when the spacing suddenly drops to close to zero, which can cause the cluster count to increment, and when the spacing suddenly jumps to about twice or more the normal spacing, which can cause the skip count to increment. The spacing may suddenly drop to close to zero because two G.711 points collapse on top of one another due to a digital impairment such as a PAD. The spacing suddenly may become twice or more the normal spacing due to one or more missing G.711 points, for example due to a digital impairment.

Then, referring to Block 420, the digital impairment is determined based on the counts of clusters and/or skips. More specifically, a small set of lists or tables with skip and cluster counts may be computed based on noise-free compression of the G.711 curve, for example corresponding to single and tandem PADs with 0.25 dB spacing from 0 to 12 dB, and all permutations of PADs from 2 to 6 dB with 1 dB spacing. Examples of these lists or tables will be shown below. Examination of these tables indicates that when PADs increase by 0.25 dB steps, there generally is only a small change in the skip and cluster count values. Stated differently, a "continuum" may be produced. Accordingly, if a PAD is encountered somewhere between the 0.25 dB spaced table entries, an interpolation or other technique may be used to determine the closest PAD. Thus, the skip counts and/or cluster counts may be less sensitive to variations between adjacent PAD levels compared to distance-based approaches for determining unknown PADs. The reason the skip and/or cluster counts may be less sensitive to these variations may be due to compressing the G.711 curve into a signature. As the curve is compressed with one PAD, for example 2.8 dB and compared to an ideal model skip and cluster count for 3 dB, it may be found that the signatures are quite close compared to, for example, a 5 dB or 6 dB PAD.

Each of the DIL intervals, for example six DIL intervals, can have its own associated skip and cluster count. Thus, the skip and cluster counts in the DIL intervals may be compared to one another. When two intervals have identical skip and cluster counts, an averaging function can average these two intervals together. If more than two intervals have identical skip and cluster counts, all of them can be averaged together, which can reduce the noise or variance in the DIL levels. A detailed approach for combining the skip and/or cluster counts in the received DIL intervals will be described below.

A more detailed description of operations to count the number of clusters and/or skips in the received DIL levels (Block 410 of FIG. 4) now will be provided. In particular, although all of the received DIL levels may be examined in order to determine a count of clusters and/or skips, preferably only a subset of the DIL levels are processed to identify clusters and/or skips. In particular, due to noise in the network, codes can be distorted so that two PCM codes may become closer or farther apart than the ideal case. The small (lower value) PCM codes may be relatively more sensitive to noise, so that cluster and/or skip values may be less indicative of the signature of the digital impairments and more indicative of noise. Accordingly, a lower bound of PCM code may be set to reduce and preferably eliminate those PCM codes that may be unduly influenced by noise.

At the upper PCM codes, distortions may be introduced due to saturation over the network. Moreover, these codes may be used sparingly. Accordingly, an upper bound preferably also is set to reduce and preferably eliminate these upper codes that may be unduly influenced by saturation or other factors. In a preferred embodiment, an upper limit u of 108 and a lower limit 1 of 32 may be set.

Figure 5:
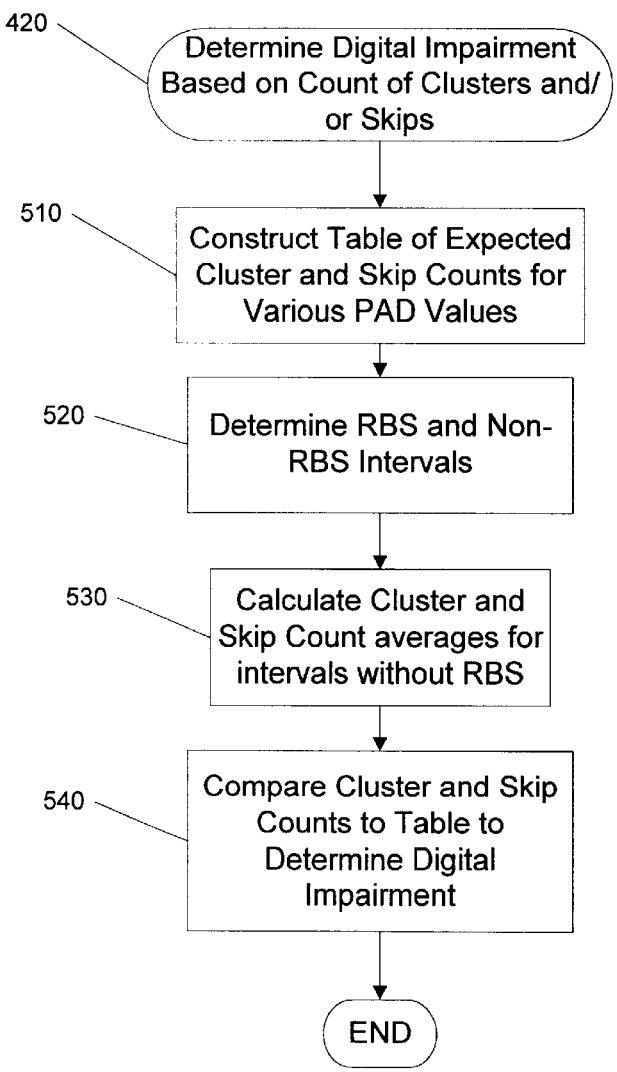
FIG. 5 is a flowchart illustrating operations for determining digital impairments based on counts of clusters and/or skips according to an embodiment of the present invention.

Referring now to FIG. 5, more detailed operations for determining digital impairments based on counts of clusters and/or skips (Block 420 of FIG. 4) now will be described. As shown in FIG. 5, at Block 510, a table of expected cluster and skip counts is constructed for various PAD values. Then at Block 520, RBS and non-RBS intervals are determined. At Block 530, cluster and skip counts are averaged for the non-RBS intervals. Finally, at Block 540, the cluster and skip counts are compared to the values in the table, in order to determine the digital impairment. Each of Blocks 510–540 now will be described in greater detail.

Referring again to Block 510, a table of expected cluster and/or skip counts is constructed for various PAD values. It will be understood that the table may be constructed offline and the resulting tables may be stored in the modem. Alternatively, tables may be constructed in the modem as needed. The table may be constructed using the following processing:

select PAD range (PAD_start to PAD_end) and step size (PAD_step)
    initialize x_lin=all PCM codes from G.711
    for P=PAD_start to PAD_end increment PAD_step {
        transmit x_lin to new PCM code with pad P,
            x_new=x_lin*10^(−P/20)
        quantize the resulting PCM code to the nearest PCM code,
            x_output=Quant(x_new)
        compute counts of cluster and skip in the final PCM code between upper and lower limits.
    }

Table 2 illustrates ideal cluster counts of a single PAD with no RBS, from 0.25 dB to 12 dB in 0.25 dB increments:

TABLE 2

| PAD Range | Cluster Counts (0.25 dB increments) | | | | | | | | | | | |
|---|---|---|---|---|---|---|---|---|---|---|---|---|
| 0.25–3 db | 5 | 5 | 6 | 5 | 8 | 9 | 10 | 11 | 10 | 13 | 11 | 12 |
| 3.25–6 Db | 14 | 11 | 11 | 11 | 10 | 9 | 10 | 8 | 7 | 6 | 4 | 4 |
| 6.25–9 dB | 4 | 5 | 6 | 8 | 10 | 10 | 11 | 12 | 13 | 14 | 15 | 15 |
| 9.25–12 db | 16 | 16 | 16 | 16 | 15 | 15 | 15 | 14 | 13 | 13 | 13 | 12 |

Table 3 illustrates ideal skip counts of single PAD with no RBS, from 0.25 dB to 12 dB in 0.25 dB increments:

TABLE 3

| PAD Range | Skip Counts (0.25 dB increments) | | | | | | | | | | | |
|---|---|---|---|---|---|---|---|---|---|---|---|---|
| 0.25–3 db | 4 | 4 | 6 | 4 | 7 | 7 | 9 | 10 | 9 | 12 | 9 | 11 |
| 3.25–6 Db | 12 | 10 | 9 | 10 | 8 | 7 | 8 | 6 | 5 | 3 | 0 | 0 |
| 6.25–9 dB | 0 | 1 | 1 | 2 | 4 | 4 | 4 | 5 | 6 | 6 | 7 | 6 |
| 9.25–12 db | 7 | 7 | 6 | 7 | 5 | 5 | 5 | 4 | 2 | 3 | 2 | 1 |

Table 4 illustrates ideal cluster counts of a tandem PAD with no RBS, from 2 dB to 6 dB in 1 dB increments:

TABLE 4

|  | 2 | 3 | 4 | 5 | 6 dB |
|---|---|---|---|---|---|
| 2dB+ | 19 | 15 | 15 | 12 | 12 |
| 3dB+ | 18 | 18 | 15 | 16 | 15 |
| 4dB+ | 16 | 17 | 19 | 15 | 15 |
| 5dB+ | 15 | 18 | 18 | 17 | 15 |
| 6dB+ | 16 | 17 | 17 | 14 | 11 |

Table 5 illustrates ideal skip counts of tandem PAD with no RBS, from 2 dB to 6 dB in 1 dB increments:

TABLE 5

|  | 2 | 3 | 4 | 5 | 6 dB |
|---|---|---|---|---|---|
| 2dB+ | 17 | 13 | 11 | 6 | 5 |
| 3dB+ | 17 | 15 | 10 | 10 | 7 |
| 4dB+ | 13 | 12 | 13 | 8 | 6 |
| 5dB+ | 10 | 11 | 10 | 7 | 5 |
| 6dB+ | 8 | 9 | 8 | 4 | 0 |

Other tables may be constructed as appropriate.

Referring again to FIG. 5, at Block 520 RBS and non-RBS intervals are determined. In particular, with the tables from the ideal model, thresholds may be set for determination of RBS and non-RBS intervals based on the cluster and/or skip counts for each interval. For example, when using PCM codes from 108 to 32 as described above, an interval may be considered to be an RBS interval if its cluster counts are greater than 21 or its skip counts are greater than 19. These large cluster and/or skip counts may be caused by RBS because RBS can change the structure of a data segment(s) in the ucode.

Referring to Block 530, cluster and skip count averages are then determined for intervals without RBS. In Block 540, the digital impairments are determined utilizing the averages calculated in Block 530. In particular, search intervals for both cluster (c) and skip (s) are determined by adding one to and subtracting one from the average cluster count (c_cnt) and average skip count (s_cnt), i.e., c=(c_cnt-1, c_cnt+1) and s=(s_cnt-1, s_cnt+1) to take noise into consideration. If c=0 and s=0 then the PAD interval=(0, 0.25). Otherwise, all single PAD intervals are found which are within a threshold, e.g., 2, of c and s simultaneously and reported. Final single PAD intervals which are +/−0.25 dB of the reported single PAD intervals are identified. All tandem PADs are found which are within a threshold, e.g., 2, of c and s simultaneously.

A more detailed description of an embodiment for computing cluster and skip counts from PCM codes 108 to 32, corresponding to Block 410 of FIG. 4 above, now will be described. There are 128 PCM codes defined in G.711, divided into 8 data segments. Each segment has 16 PCM codes and therefore has 15 spaces. A space is defined as the distance between two adjacent PCM codes. All spaces in one data segment are the same. Let S(j) and S(j−1) be the spaces of data segment j and its next smaller data segment j−1, and Bj be the boundary space in the two data segments. Then S(j)/S(j−1)=1/2 and B(j)/S(j)=3/4 according to G.711: Space between two consecutive PCM codes in the same data segment may be used to calculate counts. Since the smaller PCM codes may be more sensitive to noise, the calculation may be performed from the larger PCM code (108) to the smaller one (32) so that the space information in one data segment (larger) can be used as guidance for the calculation of space in a next data segment (smaller). Another issue in the calculation of cluster and skip counts is the boundary location of each data segment. Spaces and boundaries may be calculated as follows:

```
for mapping interval 1 to 6 {
   compute space within the G.711 segment which contains PCM code 108
   PCM code = 108 to PCM code 32{
      determine space type (normal, cluster, skip, or boundary) for the
      space between current PCM code and the next smaller one
      increment space, cluster and skip counts accordingly
      if a boundary is found {
         compute base (the largest number) of the next data segment
         compute space within the next data segment
      }
   }
}
```

Figure 6:
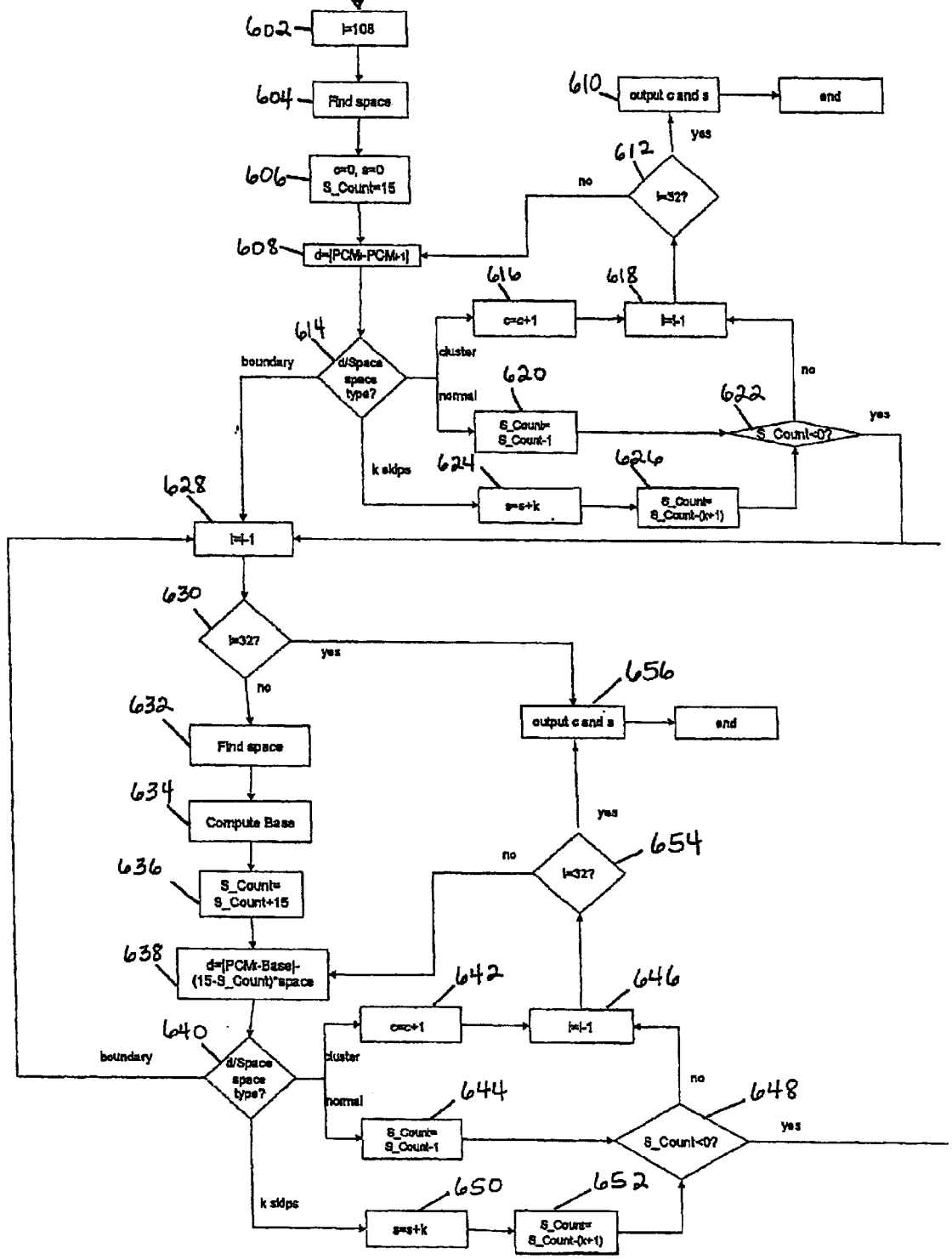
FIG. 6 is a flowchart illustrating operations for calculating cluster and skip counts in one mapping interval according to an embodiment of the present invention.

FIG. 6 is a flowchart of an embodiment for calculating cluster and skip counts in one mapping interval, corresponding to Block 410 of FIG. 4. In FIG. 6, c denotes cluster counts, s denotes skip counts, and S_Count denotes space counts in the data segment.

Referring now to FIG. 6, variable i, which is a pointer to the current ucode, is set to 108 as the initial ucode to be processed at Block 602, and at Block 604, the component "find space" (described in detail below) is executed. At Block 606, cluster count c is set to 0, skip count s is set to 0 and space count S_Count is set to 15. At Block 608, a distance measurement is defined where the distance is the distance between ucode(i) and ucode(i−1).

At Block 614, a test is made as to the space type based on the processing described in detail below. At Block 616, if it is a cluster, the cluster count is incremented and the variable i is decremented at Block 618. If i is 32 at Block 612, then c and s are output at Block 610 and operations end. If not, then a new distance measurement is computed at Block 608, and a test again is made at Block 614.

If the test at Block 614 determines that a normal boundary is present, then the space count is decremented at Block 620. As long as the space count is 0 or more, processing continues at Block 618.

Referring again to Block 614, if the test at Block 614 determines that a boundary is present, then the variable i is decremented at Block 628 and a test is made at Block 630 as to whether i is 32. If i is 32, then the cluster count and skip count are output at Block 656 and operations end. On the other hand, if i is not 32 at Block 630, then the "find space"

operation is again performed at Block 632 and a base is computed at Block 634. The space count then is incremented by 15 at Block 636 and a distance measurement is made at Block 638.

Referring now to Block 640, a test again is made as to the space type. If a cluster, then the cluster count is incremented and the variable i is decremented at Blocks 642 and 646, and if the variable i is equal to 32, the cluster count and skip count are output at Block 656. If the variable i is not 32 at Block 654, then the distance measurement is performed again at Block 638 and the space type is identified again at Block 640.

If the space type is normal, then the space count is decremented at Block 644. If the space count is less than 0 at Block 648, then the variable i is decremented at Block 628 and processing continues. On the other hand, if the space count is not less than 0 at Block 648, then the variable i is decremented at Block 646.

Referring again to Block 640, if the space type is a boundary, then the variable i is decremented at Block 628 and operations continue. On the other hand, if the space type is k skips at Block 640, then k is added to the number of skip counts at Block 650 and the space count is decremented by k+1 at Block 652. Accordingly, cluster and skip counts are computed.

An embodiment for finding a space (Blocks 604 and 632 of FIG. 6) now will be described. Let $S(j)$, $S(j-1)$, and $B(j)$ are defined as above. If a boundary or skip is found in the first 6 spaces from PCM codes 108 to 102, then the space, S, of the PCM curve segment containing PCM code 108 can be set accordingly. The space can be determined as a boundary or skip based on three consecutive non-cluster spaces, say d1, d2, d3:

if d1/d2=3/4 and d2/d3=2, then d1=B(j), d2=S(j-1)+S(j-1), and d3=S(j-1), S=d2 if d1/d2=4/5 and d2/d3=5/2, then d1=S(j), d2=B(j)+S(j-1), d3=S(j-1), S=d1 if d1/d2=8/9, then d1=S(j)+S(j), d2=S(j)+B(j)+S(j-1), d3=S(j-1), S=d1/2 if d1/d2=4/3, then d1=S(j), d2=B(j), S=d1 if d1/d2=3/2, then d1=B(j), d2=S(j-1), S=2*d2 if d1/d2=2, then d1=S(j)+S(j), d2=S(j), S=d1/2 if d1/d2=9/4, then d1=S(j), d2=S(j)+B(j)+S(j-1), S=d1 if d1/d2=5/2, then d1=B(j)+S(j-1), d2=S(j-1), S=2*d2 if d1/d2=7/2, then d1=S(j)+B(j), d2=S(j-1), S=2*d2
}

Note that due to the noise in the network, the ratio of d1/d2 generally will not be exactly the ideal case. The mid point of the two adjacent numbers may be set as the cut off point for the decision of the ratio.

If the PCM code is not in the PCM curve segment containing PCM code 108, or no boundary or skip is found in the space between PCM code 108 to 102

```
{
    calculate space in current data segment by
    {
        select all space if u*S(j) <= d <= 1*S(j) where S(j) the space in
previous data segment and S(j)= 1000
            if PCM code = 108), and (u, 1)=(0.55, 0.45) for PCM != 108
and (u, 1)=(0.8, 0.2) if PCM =108
            set space to be average of all selected spaces
        }
}
```

-continued

```
Detailed processing for determining whether a space is normal cluster,
skip or boundary (Blocks 614 and 640 of FIG. 6) now will be provided:
if the PCM curve segment contains PCM code 108 {
    let d = the space between two consecutive PCM codes
    calculate d/S
    determine space type as described below
else if the PCM curve segment does not contain PCM code 108
    let d = the space between the PCM code and the base of the data
segment - (15-space counts) * space
    calculate d/S
    determine space type as described below.
Space type may be determined using the following operations:
    cluster if d/S=0, d=0
        increment cluster count by 1
    normal if d/S=1, d=S(j)
        if S_Count == 0
            reset S_Count to 15
            calculate space S
            calculate base
        else
            decrement S_Count by 1
        end
    normal if d/S=3/4, d=B(j)
        if S_Count == 0
            reset S_Count to 15
            calculate space S
            calculate base
        else
            decrement S_Count by 1
        end
    1 skip if d/S=2, d=S(j)+S(j)
        increment skip count by 1
        if S_Count <= 1
            set S_Count = 14+S_Count
            calculate space S
            calculate base
        else
            decrement S_Count by 2
        end
    1 skip if d/S=7/4, d=S(j)+B(j) or 2 skip, d=B(j)+S(j-1)+S(j-1)
        if S_Count == 1
            increment skip count by 1
            reset S_Count to 15
            calculate space S
            calculate base
        elseif S_Count == 0
            increment skip count by 2
            reset S_Count to 13
            calculate space S
            calculate base
        elseif S_Count >= 2
            increment skip count by 1
            decrement S_Count by 2
        end
    1 skip if d/S=5/4, d=B(j)+S(j-1)
        if S_Count == 0
            increment skip count by 1
            reset S_Count to 14
            calculate space S
            calculate base
        else
            decrement S_Count by 1
        end
    2 skips if d/S=3, d=S(j)+S(j)+S(j)
        increment skip count by 2
        if S_Count <= 2
            set S_Count = 13+S_Count
            calculate space S
            calculate base
        else
            decrement S_Count by 3
        end
    2 skips if d/S=11/4, d=S(j)+S(j)+B(j)
        increment skip count by 2
        if S_Count <= 2
            set S_Count = 13+S_Count
            calculate space S
            calculate base
        else
```

```
    decrement S_Count by 3
  end
2 skips if d/S=9/4, d=S(j)+B(j)+S(j−1)
  if S_Count == 1
    increment skip count by 2
    set S_Count =13+S_Count
    calculate space S
    calculate base
  else
    increment skip count by 1
    decrement S_Count by 2
  end
}
```

Note that due to the noise in the network, the ratio of d/S generally will not be exactly the ideal case. The mid point of the two adjacent numbers may be set as the cut off point for the decision of the ratio.

The present invention can be relatively insensitive to a precise network model being known a priori. Although the present invention may not exhibit the accuracy of digital impairment detection techniques using a priori knowledge of a network model, it may not exhibit gross errors when an unknown network model is encountered, such as tandem PADs or a type of transcoding between Alaw and µlaw. An accuracy of about 0.5 dB to about 1.0 dB may be obtained.

The present invention can be less sensitive than techniques based on a priori knowledge of a network because there generally is a smooth overlap or continuum across various cluster counts from a PAD value of 0 dB increasing to a PAD value of about 12 dB. Similarly, for tandem PAD combinations such as 6 dB and 6 dB in the network, an approximate PAD estimation of 11 to 12 dB may be obtained. In sharp contrast, approaches based on a priori knowledge of a network model may be confused by tandem PADs unless the precise tandem PAD combination is known a priori. As such, if a priori knowledge of an unusual network scenario, such as tandem PADs is not known, a network model approach based on a priori knowledge of the network model may determine that the two 6 dB PADs in tandem are just one 6 dB PAD, and the power boost may be 6 dB lower than desired.

The present invention also can handle unusual uchord spacings that may violate G.711 rules. One example of this is a 3 dB type F PAD found in Raleigh and Cary, N.C. The lowest six uchords is the normal G.711 spacing, but the top chords are separated in a manner inconsistent with G.711. The present invention can recalibrate the predicted spacing between points in determining skip and cluster counts at each uchord boundary. Thus, the present invention can find an approximate PAD value of around 3 dB. In contrast, an a priori technique may identify a 4 dB or 5 dB PAD.

Finally, the present invention can be computationally efficient because it only needs to compare signatures rather than comparing an entire range of PCM codes for each DIL level. High speed modem initialization thereby may be provided.

The flow charts of FIGS. 4, 5 and 6 illustrated the architecture, functionality and operation of a possible implementation of the Phase 3 Digital Impairment Learning software 176. In this regard, each block can represents a module, segment, or portion of code, which can comprise one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of identifying digital impairments in a set of Pulse Code Modulation (PCM) signal levels that are received at a client modem from a server modem, comprising the steps of:
   identifying clusters and/or skips in the set of PCM signal levels that are received at the client modem from the server modem wherein said identifying comprises counting said clusters and/or skips; and
   determining a digital impairment in the set of PCM signal levels that are received at the client modem from the server modem based on the clusters and/or skips so identified and counted.

2. A method according to claim 1 wherein the step of determining comprises the steps of:
   obtaining a listing of cluster counts and/or skip counts for a plurality of digital impairments; and
   comparing the clusters and/or skips that are counted in the set of PCM signal levels that are received at the client modem from the server modem, to the listing of cluster counts and/or skip counts for a plurality of digital impairments to identify a digital impairment.

3. A method according to claim 2 wherein the step of obtaining comprises the step of computing cluster counts and/or skip counts for an ideal set of PCM signal levels that is subject to a plurality of digital impairments.

4. A method according to claim 1 wherein the set of PCM signal levels that are received at a client modem from a server modem comprises a plurality of sets of Digital Impairment Learning (DIL) signals that are repeatedly transmitted from the server modem to the client modem over a corresponding plurality of DIL intervals.

5. A method according to claim 4:
   wherein the step of identifying comprises the step of counting the clusters and/or skips in the plurality of sets of DIL signals; and
   wherein the step of determining comprises the step of averaging the counts for clusters and/or skips from at least two of the DIL intervals.

6. A method according to claim 1 wherein the step of identifying comprises the step of only identifying clusters and/or skips in a subset of the set of PCM signal levels that are received at the client modem from the server modem.

7. A method according to claim 1 wherein the step of identifying clusters comprises the step of identifying adjacent PCM signal levels that are within a first threshold of one another and wherein the step of identifying skips comprises the step of identifying adjacent PCM signal levels that are at least a second threshold apart from one another.

8. A method according to claim 1 wherein the step of identifying clusters comprises the step of identifying adjacent PCM signal levels that are identical to one another and wherein the step of identifying skips comprises the step of identifying adjacent PCM signal levels having level differences that are at least twice as far apart from one another as other adjacent PCM signal levels.

9. A method according to claim 1 wherein the digital impairments comprise Robbed Bit Signaling (RBS) and PAD digital impairments in a plurality of sets of Digital Impairment Learning (DIL) signals that are repeatedly received at the client modem from the server modem over a corresponding plurality of DIL intervals, and wherein the determining step comprises the steps of:

determining the DIL intervals that are not subject to RBS, based on the clusters and/or skips so identified;

averaging counts of clusters and/or skips for the DIL intervals that are not subject to RBS; and determining PAD impairments from the counts of clusters and/or skips so averaged.

10. A method of identifying digital impairments in a set of Pulse Code Modulation (PCM) signal levels that are received at a client modem from a server modem, comprising the steps of:

compressing the set of PCM signal levels that are received at the client modem from the server modem into a signature wherein said signature comprises a count of clusters and/or skips in the set of PCM signal levels; and determining a digital impairment in the set of PCM signal levels that are received at the client modem from the server modem based on the signature.

11. A method according to claim 10 wherein the set of PCM signal levels that are received at a client modem from a server modem comprises a plurality of sets of Digital Impairment Learning (DIL) signals that are repeatedly transmitted from the server modem to the client modem over a corresponding plurality of DIL intervals.

12. A method according to claim 10 wherein the digital impairments comprise Robbed Bit Signaling (RBS) and PAD digital impairments in a plurality of sets of Digital Impairment Learning (DIL) signals that are repeatedly received at the client modem from the server modem over a corresponding plurality of DIL intervals, and wherein the determining step comprises the steps of:

determining the DIL intervals that are not subject to RBS, based on the clusters and/or skips so compressed;

averaging counts of clusters and/or skips for the DIL intervals that are not subject to RBS; and determining PAD impairments from the counts of clusters and/or skips so averaged.

13. A modem comprising:

means for receiving a set of Pulse Code Modulation (PCM) signal levels from a server modem;

means for identifying clusters and/or skips in the set of PCM signal levels that are received from the server modem comprising means for counting said clusters and/or skips; and means for determining a digital impairment in the set of PCM signal levels that are received from the server modem in response to the means for identifying and counting.

14. A modem according to claim 13 wherein the means for determining comprises:

means for obtaining a listing of cluster counts and/or skip counts for a plurality of digital impairments; and means for comparing the clusters and/or skips that are counted in the set of PCM signal levels that are received from the server modem, to the listing of cluster counts and/or skip counts for a plurality of digital impairments to identify a digital impairment.

15. A modem according to claim 14 wherein the means for obtaining comprises means for computing cluster counts and/or skip counts for an ideal set of PCM signal levels that is subject to a plurality of digital impairments.

16. A modem according to claim 13 wherein the set of PCM signal levels that are received from a server modem comprises a plurality of sets of Digital Impairment Learning (DIL) signals that are repeatedly transmitted from the server modem over a corresponding plurality of DIL intervals.

17. A modem according to claim 16:

wherein the means for identifying comprises means for counting the clusters and/or skips in the plurality of sets of DIL signals; and wherein the means for determining comprises means for averaging the counts for clusters and/or skips from at least two of the DIL intervals.

18. A modem according to claim 13 wherein the means for identifying comprises means for only identifying clusters and/or skips in a subset of the set of PCM signal levels that are received from the server modem.

19. A modem according to claim 13 wherein the means for identifying clusters comprises means for identifying adjacent PCM signal levels that are within a first threshold of one another and wherein the means for identifying skips comprises means for identifying adjacent PCM signal levels that are at least a second threshold apart from one another.

20. A modem according to claim 13 wherein the means for identifying clusters comprises means for identifying adjacent PCM signal levels that are identical to one another and wherein the means for identifying skips comprises means for identifying adjacent PCM signal levels having level differences that are at least twice as far apart from one another as other adjacent PCM signal levels.

21. A modem according to claim 13 wherein the digital impairments comprise Robbed Bit Signaling (RBS) and PAD digital impairments in a plurality of sets of Digital Impairment Learning (DIL) signals that are repeatedly received from the server modem over a corresponding plurality of DIL intervals, and wherein the means for determining comprises:

means for determining the DIL intervals that are not subject to RBS, in response to the means for identifying;

means for averaging counts of clusters and/or skips for the DIL intervals that are not subject to RBS; and means for determining PAD impairments from the counts of clusters and/or skips in response to the means for averaging.

22. A modem comprising:

means for receiving a set of Pulse Code Modulation (PCM) signal levels from a server modem;

means for compressing the set of PCM signal levels that are received from the server modem into a signature wherein said signature comprises a count of clusters and/or skips in the set of PCM signed levels; and means for determining a digital impairment in the set of PCM signal levels that are received from the server modem based on the signature.

23. A modem according to claim 22 wherein the set of PCM signal levels that are received from a server modem comprises a plurality of sets of Digital Impairment Learning (DIL) signals that are repeatedly transmitted from the server modem over a corresponding plurality of DIL intervals.

24. A modem according to claim 22 wherein the digital impairments comprise Robbed Bit Signaling (RBS) and PAD digital impairments in a plurality of sets of Digital Impairment Learning (DIL) signals that are repeatedly received from the server modem over a corresponding plurality of DIL intervals, and wherein the means for determining comprises:

means for determining the DIL intervals that are not subject to RBS, in response to the means for identifying;

means for averaging counts of clusters and/or skips for the DIL intervals that are not subject to RBS; and means for determining PAD impairments from the counts of clusters and/or skips in response to the means for averaging.

25. A computer program product identifying digital impairments in a set of Pulse Code Modulation (PCM) signal levels that are received at a client modem from a server modem, the computer program product comprising a computer-readable storage medium having computer-readable program code embodied in the medium, the computer-readable program code comprising:

computer-readable program code for identifying and counting clusters and/or skips in the set of PCM signal levels that are received at the client modem from the server modem; and computer-readable program code for determining a digital impairment in the set of PCM signal levels that are received at the client modem from the server modem in response to the computer-readable program code for identifying and counting.

26. A computer program product according to claim 25 wherein the computer-readable program code for determining comprises:

computer-readable program code for obtaining a listing of cluster counts and/or skip counts for a plurality of digital impairments; and computer-readable program code for comparing the clusters and/or skips that are counted in the set of PCM signal levels that are received at the client modem from the server modem, to the listing of cluster counts and/or skip counts for a plurality of digital impairments to identify a digital impairment.

27. A computer program product according to claim 26 wherein the computer-readable program code for obtaining comprises computer-readable program code for computing cluster counts and/or skip counts for an ideal set of PCM signal levels that is subject to a plurality of digital impairments.

28. A computer program product according to claim 25 wherein the set of PCM signal levels that are received at a client modem from a server modem comprises a plurality of seas of Digital Impairment Learning (DIL) signals that are repeatedly transmitted from the server modem to the client modem over a corresponding plurality of DIL intervals.

29. A computer program product according to claim 28:

wherein the computer-readable program code for identifying comprises computer-readable program code for counting the clusters and/or skips in the plurality of sets of DIL signals; and wherein the computer-readable program code for determining comprises computer-readable program code for averaging the counts for clusters and/or skips from at least two of the DIL intervals.

30. A computer program product according to claim 25 wherein the computer-readable program code for identifying comprises computer-readable program code for only identifying clusters and/or skips in a subset of the set of PCM signal levels that are received at the client modem from the server modem.

31. A computer program product according to claim 25 wherein the computer-readable program code for identifying clusters comprises computer-readable program code for identifying adjacent PCM signal levels that are within a first threshold of one another and wherein the computer-readable program code for identifying skips comprises computer-readable program code for identifying adjacent PCM signal levels that are at least a second threshold apart from one another.

32. A computer program product according to claim 25 wherein the computer-readable program code for identifying clusters comprises computer-readable program code for identifying adjacent PCM signal levels that are identical to one another and wherein the computer-readable program code for identifying skips comprises computer-readable program code for identifying adjacent PCM signal levels having level differences that are at least twice as far apart from one another as other adjacent PCM signal levels.

33. A computer program product according to claim 25 wherein the digital impairments comprise Robbed Bit Signaling (RBS) and PAD digital impairments in a plurality of sets of Digital Impairment Learning (DIL) signals that are repeatedly received at the client modem from the server modem over a corresponding plurality of DIL intervals, and wherein the computer-readable program code for determining comprises:

computer-readable program code for determining the DIL intervals that are not subject to RBS, in response to the computer-readable program code for identifying;

computer-readable program code for averaging counts of clusters and/or skips for the DIL intervals that are not subject to RBS; and computer-readable program code for determining PAD impairments from the counts of clusters and/or skips in response to the computer-readable program code for averaging.

34. A computer program product identifying digital impairments in a set of Pulse Code Modulation (PCM) signal levels that are received at a client modem from a server modem, the computer program product comprising a computer-readable storage medium having computer-readable program code embodied in the medium, the computer-readable program code comprising:

computer-readable program code for compressing the set of PCM signal levels that are received at the client modem from the server modem into a signature wherein said signature comprises a count of clusters and/or skips in the set of PCM signal levels; and computer-readable program code for determining a digital impairment in the set of PCM signal levels that are received at the client modem from the server modem based on the signature.

35. A computer program product according to claim 34 wherein the set of PCM signal levels that are received at a client modem from a server modem comprises a plurality of sets of Digital Impairment Learning (DIL) signals that are repeatedly transmitted from the server modem to the client modem over a corresponding plurality of DIL intervals.

36. A computer program product according to claim 34 wherein the digital impairments comprise Robbed Bit Signaling (RBS) and PAD digital impairments in a plurality of sets of Digital Impairment Learning (DIL) signals that are repeatedly received at the client modem from the server modem over a corresponding plurality of DIL intervals, and wherein the computer-readable program code for determining comprises:

computer-readable program code for determining the DIL intervals that are not subject to RBS, in response to the computer-readable program code for identifying;

computer-readable program code for averaging counts of clusters and/or skips for the DIL intervals that are not subject to RBS; and computer-readable program code for determining PAD impairments from the counts of clusters and/or skips in response to the computer-readable program code for averaging.

* * * * *